(12) United States Patent
Lopez et al.

(10) Patent No.: US 11,531,918 B2
(45) Date of Patent: Dec. 20, 2022

(54) INTERACTIVE LIVE EVENT OUTCOME SELECTION AND PREDICTION

(71) Applicant: CBS Interactive Inc., San Francisco, CA (US)

(72) Inventors: Leonard Michael Lopez, Coral Gables, FL (US); Carlos Javier Carbonell Di Mola, Sunrise, FL (US); Raymond Solebello, Boca Raton, FL (US); Christian J. Soblotne, Pompano Beach, FL (US); Patrick Mark Quinlivan, Ponte Vedra, FL (US)

(73) Assignee: CBS INTERACTIVE INC., San Francisco, CA (US)

( * ) Notice: Subject to any disclaimer, the term of this patent is extended or adjusted under 35 U.S.C. 154(b) by 877 days.

(21) Appl. No.: 16/391,997

(22) Filed: Apr. 23, 2019

(65) Prior Publication Data

US 2019/0251463 A1    Aug. 15, 2019

Related U.S. Application Data

(63) Continuation of application No. 14/928,554, filed on Oct. 30, 2015, now Pat. No. 10,318,879.

(51) Int. Cl.
*G06N 7/00*     (2006.01)
*H04W 4/029*    (2018.01)
*H04L 67/75*    (2022.01)

(52) U.S. Cl.
CPC .............. *G06N 7/005* (2013.01); *H04L 67/75* (2022.05); *H04W 4/029* (2018.02)

(58) Field of Classification Search
None
See application file for complete search history.

(56) References Cited

U.S. PATENT DOCUMENTS

2008/0085770 A1\* 4/2008 Morgan ................. G07F 17/32
                                                463/42
2011/0014974 A1   1/2011 Torf
                  (Continued)

FOREIGN PATENT DOCUMENTS

WO   WO-2005099839 A1 \* 10/2005 ............. G07F 17/32
WO   WO-2015048506 A1 \*  4/2015 ......... G07F 17/3218

OTHER PUBLICATIONS

Keith Goldner, Avoid the Dreaded Twos, Fives, Nines https://si.com/2015/01/28/super-bowl-squares-xlix-nfl-analytics (Year: 2015).

(Continued)

*Primary Examiner* — Alan Chen
(74) *Attorney, Agent, or Firm* — KDB Firm PLLC

(57) ABSTRACT

A method for providing an interactive interface for live event outcome selection and prediction may include generating a set of cells for an event. The set of cells may be provided to a client device to present in a user interface. A selection of a cell may be received from the client device. The selected cell may be assigned to a user account. The method may generate a coordinate for each cell in the set, wherein each cell coordinate includes a plurality of dimensions, each dimension corresponding to a different entity of the event, and wherein each cell coordinate is unique for the set of cells. The method may comprise calculating, prior to the start of the event, a probability that an event result represented by a cell coordinate will occur; and presenting the probability in association with the cell on the user interface. Other embodiments are described and claimed.

18 Claims, 17 Drawing Sheets

(56) References Cited

U.S. PATENT DOCUMENTS

2013/0045794 A1 2/2013 Vlazny et al.
2016/0210815 A1 7/2016 Holt et al.
2016/0358406 A1 12/2016 Daly
2017/0249804 A1 8/2017 Alexander
2017/0249806 A1 8/2017 Lutnick et al.

OTHER PUBLICATIONS

Drew Conway, Best Boxes in a Super Bowl Pool, http://www.dataists.com/2011/02/best-boxes-in-a-super-bowl-pool/ (Year: 2011).

* cited by examiner

INTERACTIVE LIVE EVENT OUTCOME SELECTION AND PREDICTION

CROSS-REFERENCE TO RELATED APPLICATIONS

This application claims the benefit of U.S. Non-Provisional application Ser. No. 14/928,554, filed Oct. 30, 2015. The aforementioned Non-Provisional application is incorporated by reference herein in its entirety.

BACKGROUND

Spectators of live events may enjoy enhancing their viewing of an event by predicting and speculating on outcomes during the live event. In some cases, once a prediction is made, the spectator may need to wait until portions or all of the live event are over to know if their prediction was correct. The spectators may have little understanding of how actions during the event may affect their predictions.

DETAILED DESCRIPTION

Figure 1:
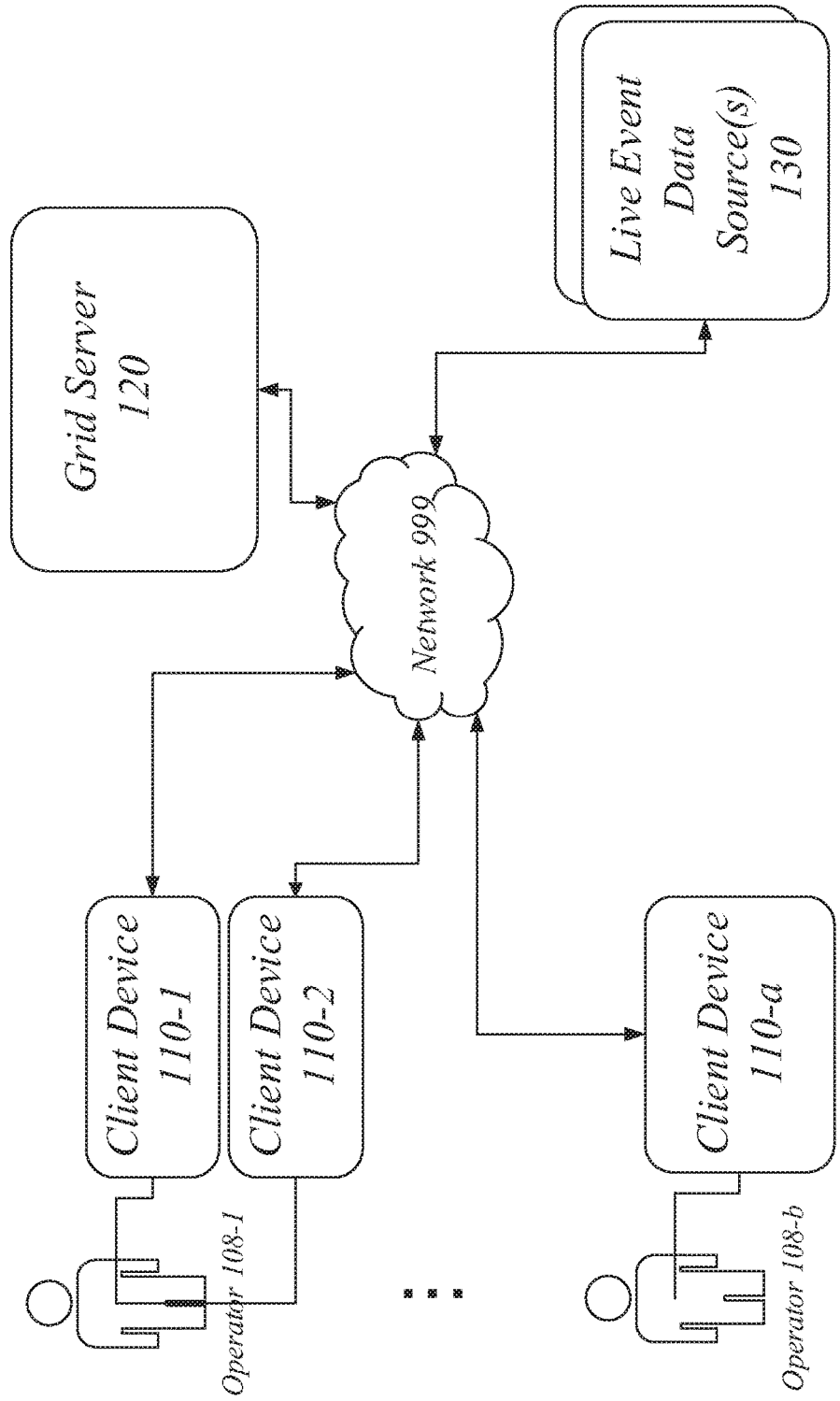
FIG. 1 illustrates an embodiment of a system for broadcasting live event data.

Various embodiments are generally directed to techniques for providing an interactive interface for live event outcome selection and prediction. Some embodiments are directed to techniques to present an interface where participants can select possible outcomes for a live event, and where live event data is used to present predicted outcomes in real-time. A live event may include, for example, a gaming event, a sporting event, a political debate, or any event that generates discrete outcomes.

A conventional method of participating vicariously in a live event is known as a box pool. In a box pool, a grid is created, usually on paper and having two dimensions, and participants select boxes in the grid. Once all of the boxes are selected by participants, integer coordinates for the boxes are generated for each dimension on a random basis. Each dimension may correspond to one of the competitors in the live event, e.g. a sports team. The participants may pay a fee for "owning" a selected box. At the end of a defined time period, the box having coordinates that correspond to the current state of the live event "wins." For example, if the score for a game is 3-0 at the end of the first quarter, the box having coordinates (3, 0) wins. The participant who owns the box may win a reward for winning. Conventional box pools are static, and participants have to wait until the end of the defined time period to know whether their selected box wins.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to an apparatus or system for performing these operations. This apparatus may be specially constructed for the specified purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct a more specialized apparatus to perform the required method steps. The structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a block diagram for a system 100 for providing an interactive interface for live event outcome selection and prediction. In one embodiment, the system 100 may comprise a computer-implemented system 100 having various elements, such as a client devices 110-1 through 110-$a$, where $a$ represents a positive integer, a grid server 120, and one or more live event data sources 130. The elements may be communicatively coupled via a one or more networks, such as network 999. Although the system 100 shown in FIG. 1 has a limited number of elements in a certain topology, it may be appreciated that the system 100 may include more or fewer elements in alternate topologies as desired for a given implementation.

The system 100 may include a grid server 120. Grid server 120 may comprise one or more electronic devices capable of receiving, processing, and sending information for the system 100. Examples of an electronic device may include, without limitation, an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

Grid server 120 may generate and manage multiple sets of cells related to live events for box-pool style user interactions. In particular, grid server 120 may generate the cells, cause the cells to be associated with user accounts, and generate cell coordinates for each cell. Grid server 120 may use historical data about past events to generate probabilities associated with the individual cells. Grid server 120 may receive live data from one or more live data sources 130, and may use the live data to predict which cells may correspond to a potential result during the live event. When a particular cell corresponds to an event result during the live event, grid server 120 may reward the user account associated with the cell. Embodiments and operations of grid server 120 are discussed below with respect to FIG. 3.

Live data sources 130 may include data feeds, generated by computing devices associated with a live event, monitored by grid server 120. Live data sources 130 may also include data gathered by human observers of a live event and entered into an interface that communicates the gathered data to grid server 120 as live data.

In an embodiment, grid server 120 and live data access server 130 may be owned and/or under the control of the same content provider entity, such as CBS SPORTS INC., owned by CBS INTERACTIVE INC., San Francisco, Calif. In other embodiments, grid server 120 and live data access server 130 may be owned and/or under the control of separate entities.

The system 100 may comprise a client device 110. A client device, e.g. client device 110-1, may be usable by an operator, e.g. operator 108-1, to view and interact with one or more sets of cells, also referred to herein as a grid, related to a specific live event. Client device 110 may include any electronic device as described above. A client device 110 may also be able to receive and present live event data, including video or audio streaming data, of a live event taking place. An operator, e.g. operator 108-1, may own and/or use more than one client device 110 at a time. One client device 110 may present the set of cells, while another may present live event data.

Figure 2:
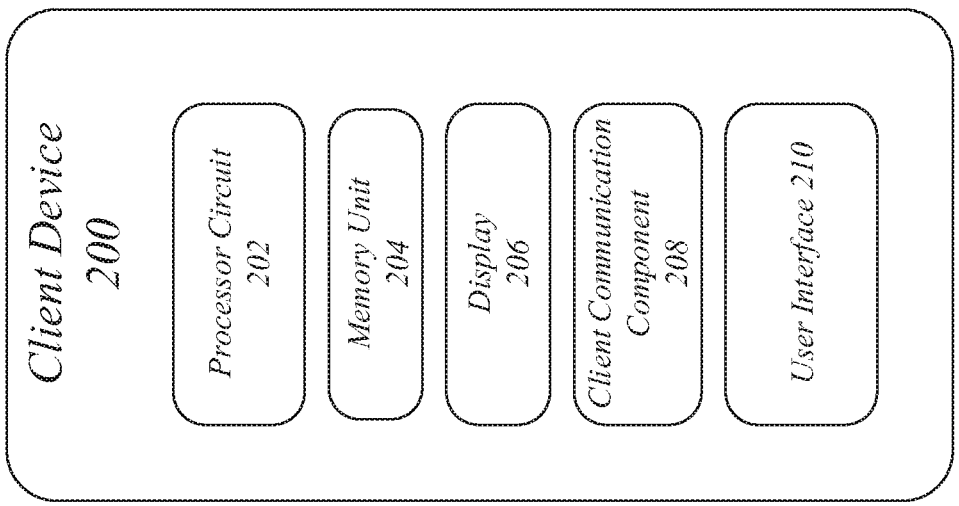
FIG. 2 illustrates an embodiment of a client device.

FIG. 2 illustrates an embodiment of a client device 200. Client device 200 may be a representative example of a client device 110. Client device 200 may execute processing operations or logic using a processor circuit 202. Processor circuit 202 may comprise various hardware elements. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth.

Client device 200 may include one or more memory units 204. A memory unit 204 may include various computer-readable storage devices, volatile and non-volatile, that store data and instructions for retrieval by processor circuit 202. As used herein, a memory unit 204 does not include signals or carrier waves, such as electromagnetic or optical waves. Memory units are described further with respect to FIG. 16.

Client device 200 may include a display 206. Display 206 may be integrated into client device 200, or may be separate but communicatively coupled to client device 200. Display 206 may include a touch-sensitive surface that can detect a touch gesture or a proximity gesture, which may include contact with, or proximity to, items such as a human fingertip, a stylus, an electronic pen, and so forth. Display 206 may also include conventional computer monitors or integrated laptop computer screens.

Client 200 may include a client communication component 208. Client communication component 208 may include hardware and/or software capable of connecting to another device, e.g. grid server 120, and communicating electronic data across the connection. In an embodiment, for example, client communication component 208 may request a web page or user interface elements from grid server 120 for presentation and interaction on the client device 200. The embodiments are not limited to these examples.

Client 200 may include a user interface 210. The user interface 210 may include functions that allow an operator, e.g. operator 108-$b$, to open a connection with the grid server 120, request the grid for a live event, and view the grid on display 206. In an embodiment, the user interface 210 may be a stand-alone application executing on processor circuit 202. In another embodiment, the user interface 210 may be presented in a web browser application executing on processor circuit 202 in communication with the grid server 120.

Figure 3:
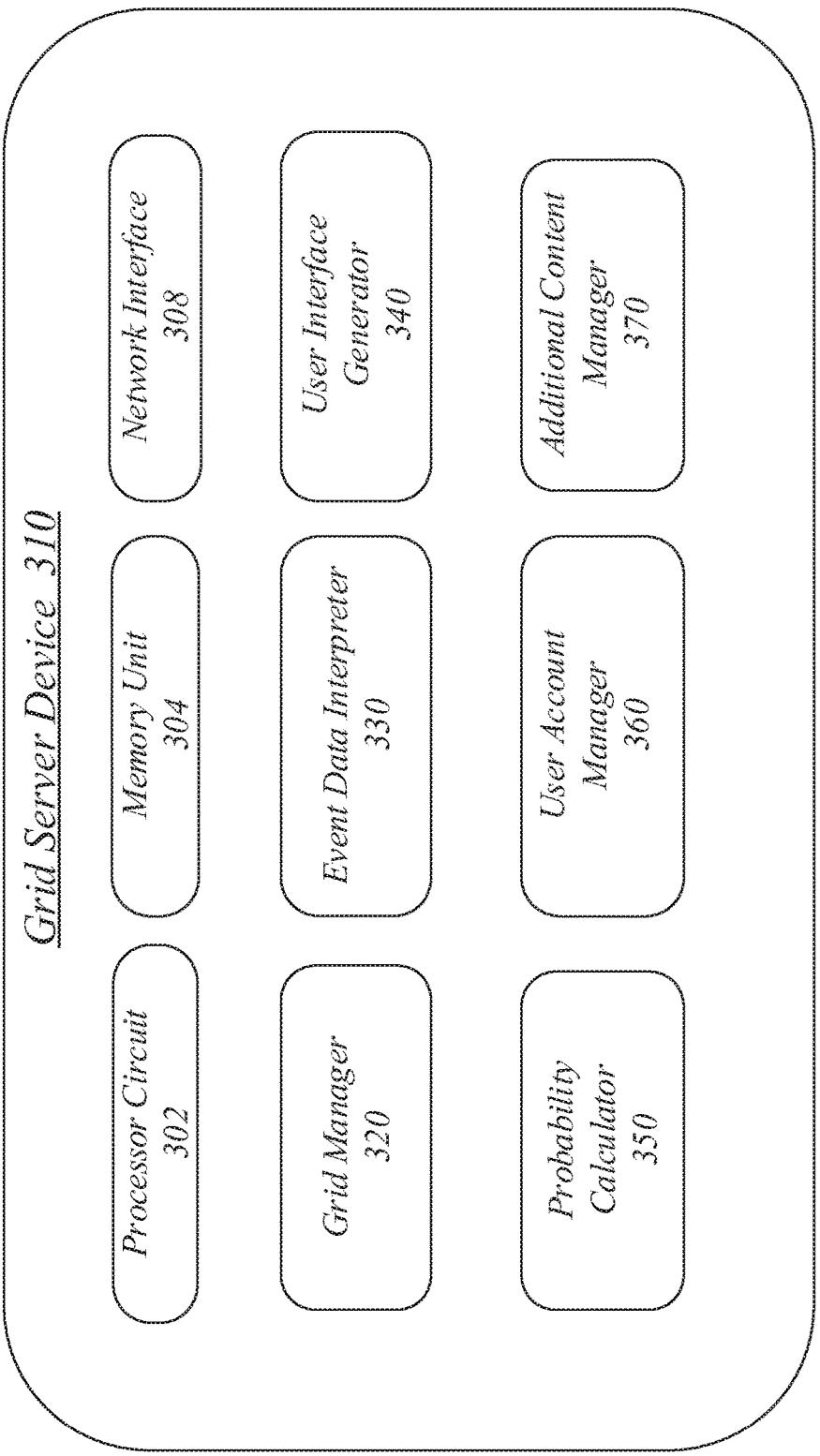
FIG. 3 illustrates an embodiment of an operating environment.

FIG. 3 illustrates an embodiment of an operating environment 300. Operating environment 300 may comprise an embodiment of a grid server 310. Grid server 310 may be a representative example of the grid server 120. Grid server 310 may include a processor circuit 302 and a memory unit 304, which may be analogous to processor circuit 202 and memory unit 204. Grid server 310 may include a network interface 308 which may include hardware and/or software to communicate information with clients 110 and the live data servers 130. Although depicted as a single entity, the grid server 310 may be embodied on one or more physical devices, which may be co-located or distributed in various locations.

Grid server 310 may include one or more functional elements that provide the operations described herein. The functional elements may be encoded in software and/or hardware instructions that are executed by the processor circuit 302 to perform the described operations. For example, the grid server 310 may include a grid manager 320, an event data interpreter 330, a user interface generator 340, a probability calculator 350, a user account manager 360 and an additional content manager 370. More, fewer, or other functional elements may be used. In some embodiments, some of the functional elements may be combined into one functional element.

The grid manager 320 may generate a set of cells for a live event. The grid manager 320 may generate a set of cells at the direction of a user, e.g. an operator 108, referred to herein as the grid owner. The number of cells generated may depend on the type of event, the number of entities participating in the event, and/or the number of outcomes that are possible for the event. The grid owner may use a default number of cells for a type of event, or may specify a number of cells.

In some embodiments, the gird owner may define an event time interval for the set of cells when creating the set. Some live events have built-in time intervals, such as periods of play. For live events without defined time periods, the event time interval may be defined by, for example, a number of actions, e.g. a number of holes of golf played, or a number of sets in tennis; a round in a tournament; or a user-defined time period, e.g. every 20 minutes. The gird owner may select using the built-in time intervals for an event, or may override the built-in time intervals with user-defined time intervals.

The grid manager 320 may generate a cell identifier for each cell in the set of cells. The cell identifier may serve to identify the cell uniquely within the particular set of cells.

The grid owner may invite other users, or otherwise open the generated set of cells to participants. For example, the grid owner may provide contact information for potential participants to the grid manager 320. The grid manager may use the contact information to send messages to the potential participants that include a link to the generated set of cells. The messages may be e-mail messages, text messages, SMS or MMS messages, social network service messages, and so forth. A link to the set of cells may be published, for example, on a website for one of the entities in the live event, or for a content provider, for more public participation. The participants may select cells that are then assigned to user accounts for the participants, as will be described below.

The grid manager 320 may assign a cell coordinate to each cell in a set. In some embodiments, the cell coordinates may be assigned after all, or a threshold number, of cells in the set are selected by participants and assigned to user accounts. The cell coordinates may be randomly generated, and are unique to each cell within the set. Each cell coordinate includes a plurality of dimensions, each dimension corresponding to a different entity of the event. For example, for a live event having two teams playing against each other, the cell coordinate will have two dimensions, one for each team. The cell coordinate may represent a possible outcome during the live event. For example, a cell coordinate of (5, 9) may correspond to a score at half time where a first entity has a score ending in "5" and a second entity has a score ending in "9".

Generally, once the cell coordinates are assigned, the grid manager 320 may prevent further changes in ownership of the cells in a set. In some embodiments, the grid manager 320 may allow different users who own cells in the same set or in different sets to exchange ownership. This exchange may be allowed, for example, while action in the live event is suspended, such as during a time-out, a commercial break, or at the end of an event time interval before the next event time interval begins. When exchanged, the user accounts assigned to a cell coordinate are changed to reflect the new owner. In some embodiments, payment to the grid server or to the other user in the exchange may take place.

The event data interpreter 330 may receive live data about the live event and may parse the live data into discrete elements. The event data interpreter 330 may predict an event result from the parsed live data. For example, the live data may include, for a baseball game, that there are runners on each base and one out, and the event data interpreter 330 may predict that the score for the at-bat team will increase by four points. The event data interpreter 330 may compare the predicted event result to cell coordinates for the set of cells and may determine, at an event time interval, which cell has a cell coordinate that represents a status of the event. For example, if the current score is 4 to 3 for entities 1 and 2, respectively, and entity 2 is at-bat, then the cell having the coordinates (4, 7) corresponds to the predicted score. The event data interpreter 330 may provide the cell coordinate to the user interface generator 340. In some embodiments, the event data interpreter 330 may cause a notification to be sent to a user having the user account assigned to the determined cell that the user may win, or has won.

The user interface (UI) generator 340 may generate instructions for one or more user interfaces for presentation on a client device. The UI generator 340 may provide an interface through which a grid owner can define and create a set of cells. The UI generator 340 may receive the set of cells from the grid manager 320, and provide another user interface to present the set of cells in the user interface 210 via the network interface 308. The UI generator 340 may receive the cell coordinates that match a predicted event, and may modify an appearance of the cell having the cell coordinates on the user interface 210. The UI generator 340 may present an indication of the predicted event in the determined cell.

The probability calculator 350 may calculate various probabilities associated with a live event. For example, the probability calculator 350 may calculate a probability that an event result represented by a cell coordinate will occur during the event. The probability calculator 350 may provide the calculated probabilities to the UI generator 340 for presentation in association with the cell having the cell coordinate on the user interface 210. The probability calculator 350 may calculate a probability that a predicted event result will occur.

The probability calculator 350 may calculate a percentage of instances of events where the cell coordinates of a cell corresponded to an event result. For example, the probability calculator 350 may access historical data about events of a specific type, e.g. a basketball game, or about events between two specific entities, e.g. between the RAVENS® and STEELERS® football teams, and may calculate, for each cell coordinate, the percentage of times that the result associated with the cell coordinate has occurred. The probability calculator 350 may provide the calculated percentages to the UI generator 340 to present in association with the cell on the user interface 210.

The user account manager 360 may receive a selection of a cell and a user account from a client device 110 and may assign the selected cell to a user account. The user account manager 360 may receive or coordinate a payment from a user account associated with the cell selection. Payment may be in the form of funds transferred from a bank account or credit card associated with the user account, or may be in the form of points or credits earned by the user from other activities.

The user account manager 360 may provide a reward to the user account when a cell assigned to the user account has a cell coordinate that represents a status of the event at an event time interval. The reward may be in the form of funds, or may be points, credits, or other incentives. A winning cell may be determined at specific event time intervals. Rewards may be earned when a cell is determined to have won. The grid owner may specify, when creating the set of cells, at which event time intervals rewards may be earned.

The user account manager 360 may track and store the success rate of the user accounts, and may modify rewards for user accounts that are associated with more winning cells or higher percentages of winning cells. For example, user accounts that have a higher rate of winning compared to other user accounts may receive bonus rewards, or a positive percentage adjustment to a reward, to incentivize continued participation.

The additional content manager 370 may provide a live data stream of the event to the client device, e.g. client device 110-1, or to a second client device associated with a user account, e.g. client device 110-2. The additional content manager 370 may select additional content related to the event; and may provide the additional content to the client device 110 for display. The additional content may be related to the live event and may include, for example and without limitation, video data, audio data, advertisements, text content, statistics, historical data, or links to additional content.

Figure 4:
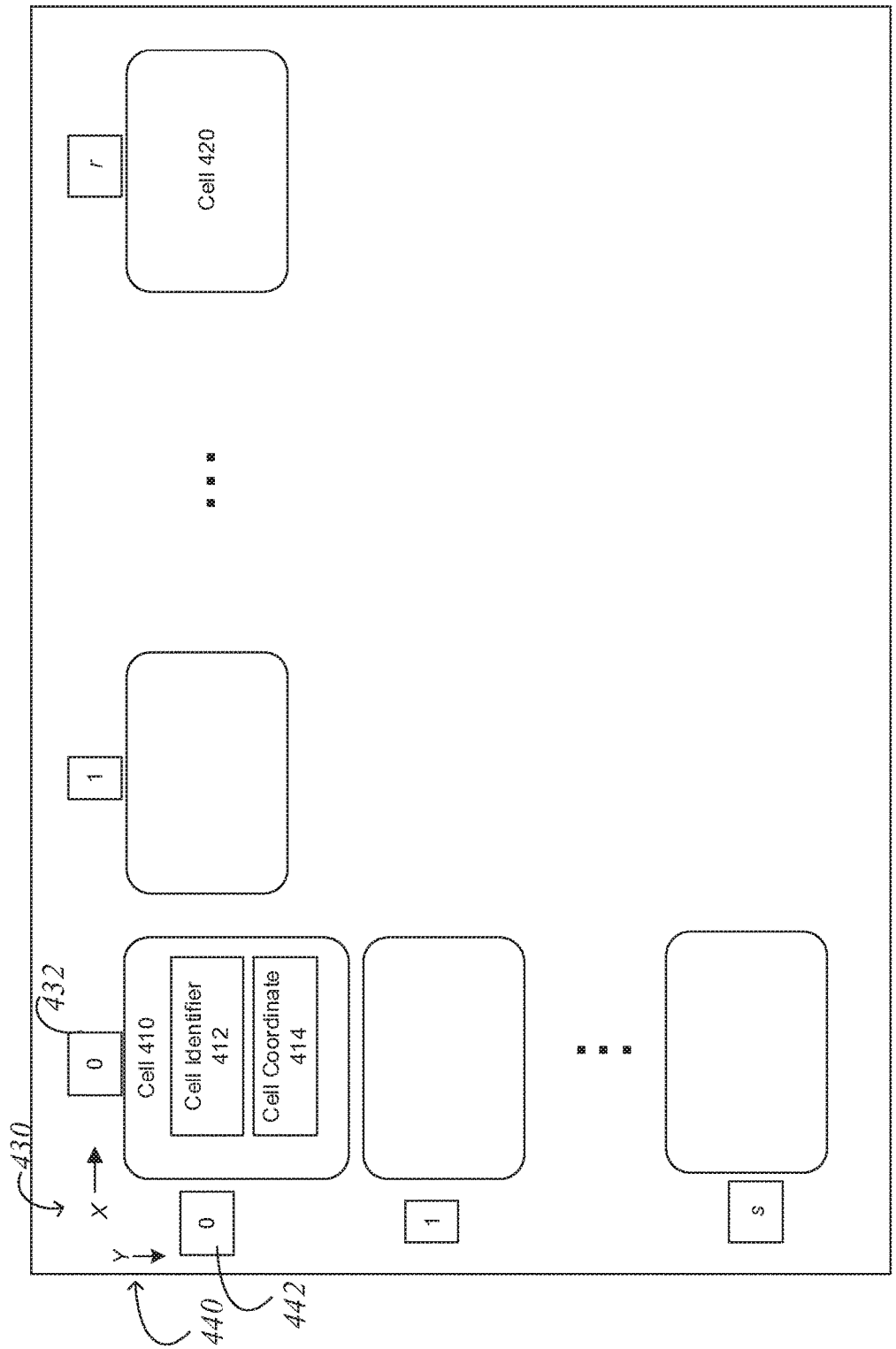
FIG. 4 illustrates an embodiment of a set of cells.

FIG. 4 illustrates an embodiment of a set of cells 400. A set of cells 400 may be represented by one or more dimensions. Each dimension may correspond to a participant or competitor in a live event. For example, in a football game event, the set of cells 400 may have two dimensions, one for each team playing the game. In an event with multiple competitors, such as a tennis tournament, a swim meet, a political election, multi-team tournaments and so forth, there may be a dimension for each participant or each team. As shown in FIG. 4, the set of cells 400 has two dimensions: dimension 430, represented by the X axis, and dimension 440, represented by the Y axis.

A set of cells may be implemented in any data structure that permits the operations described herein. For example, and without limitation, a set of cells may be implemented within a database, as a spreadsheet, a set of objects, an array of objects, and so forth.

Each cell in the set of cells 400 may have a cell identifier. For example, cell 410 has a cell identifier 412. The cell identifier 412 serves to uniquely identify a cell within a set of cells 400. The cell identifier 412 may not be unique to a plurality of sets of cells. In an embodiment, the cell identifier 412 may correspond to a positional coordinate within a grid. For example, the cell identifier 412 may be composed of an x-coordinate 432 and a y-coordinate 442, e.g. (0, 0), and the cell identifier for the cell 420 may be (r, 0). In other embodiments, cell identifiers may be randomly or sequentially generated, and may not be related to a position of the cell within the set.

Each cell in the set of cells 400 may also have a cell coordinate. For example, cell 410 has a cell coordinate 414. The cell coordinate is assigned to a cell once all, or a specified number or percentage of, the cells in the set have been selected and assigned to a user account. The cell coordinate includes the number of dimensions of the set of cells and represents a potential event result. In an embodiment, the cell coordinates are randomly generated. The cell coordinate is not related to a position of the cell within the set of cells. The cell coordinate of a cell is also unique to the particular set of cells.

By way of example, in a box pool for a basketball game, cell coordinates are two dimensional and include integers between 0 and 9. A cell coordinate of (7, 4), for example, represents a score at a time interval, e.g. at the end of a quarter, half-time or end of game, where the first team's score ends in "7" and the second team's score ends in "4". Possible scores that correspond to a cell coordinate of (7, 4) include (7,4), (17, 4), (7, 14), (27, 14) and so forth. The embodiments are not limited to ten possible values per dimension, and more or fewer possible values may be used, depending on the type of live event, the possible score values, and/or the number of desired cells in the set of cells. Tennis, for example, may have the available values of 0, 15, 30 and 40. A presidential election may have available integer values corresponding to a number of electoral college votes, or states, won by a candidate. The embodiments are not limited to these examples.

In some embodiments the cell identifier 412 is different from the cell coordinate 414. This may occur when the cell coordinates are generate only after sufficient cells have been assigned to user accounts. In other embodiments, the cell coordinates may be generated prior to assignment and may be used as the cell identifier. In such an embodiment, the actual cell coordinates may be hidden from potential participants until a sufficient number of cells have been selected and assigned to user accounts. In still other embodiments, the cell coordinates may be viewed by the potential participants before making their cell selections.

Figure 5:
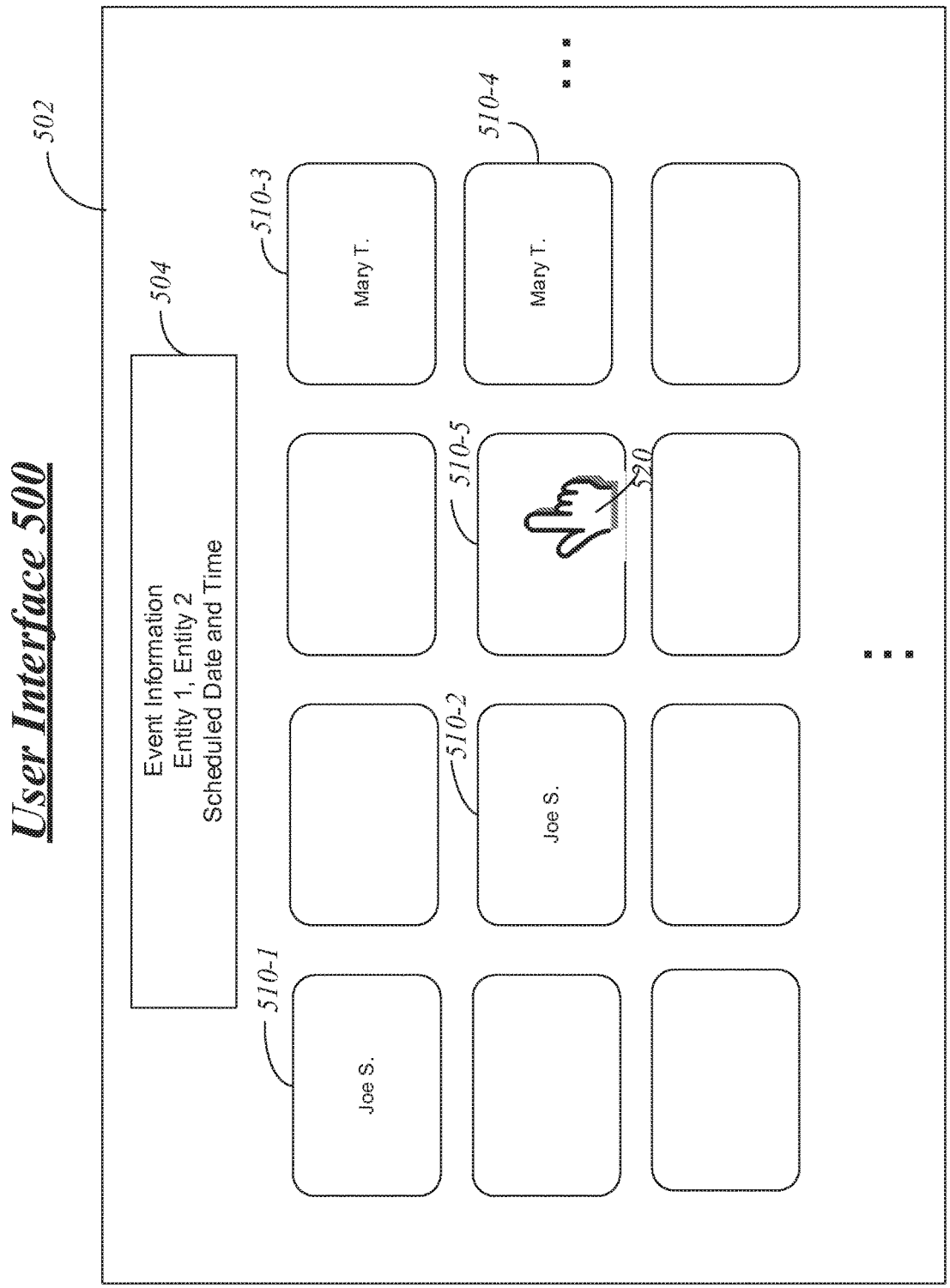
FIG. 5 illustrates an embodiment of a user interface.

FIG. 5 illustrates an embodiment of user interface (UI) 500. UI 500 may be presented by the user interface 210. UI 500 may include various UI elements that allow an operator 108 of a client device 110 to select one or more cells in a set of cells related to an upcoming live event. For example, and without limitation, UI 500 may include a display area 502 and a legend 504 that include information about the live event, such as the names of the entities participating in the event, e.g. team names, and the scheduled date and time of the event.

UI 500 also includes cells displayed for selection. Some cells are already selected and assigned to various user accounts. For example, cells 510-1 and 510-2 are assigned to a user account for "Joe S.". Cells 510-3 and 510-4 are assigned to a user account for "Mary T.". An unassigned cell, e.g. cell 510-5, may be selected by a control directive 520. For example, the cell may be touched by a finger, stylus, mouse cursor or other input device. The cells visible in FIG. 5 may be a subset of an entire set of cells for the live event.

In some embodiments, a user, prior to the cell selection process, may have registered and/or been invited to participate in a particular set of cells for a live event. The grid server 120 may have some amount of information about a particular user, for example, a user name and an authenticator such as a password. The user may have an associated user account, which may be used to identify which cells are selected by the user, and may coordinate payments and rewards to the user when a cell assigned to the user account wins.

When a cell is selected by a user, a payment may be made by the user account in order to secure the assignment of the cell to the user account. A payment may be include a transfer or funds from a bank account or credit card to the entity operating the grid server 120. A payment may also be in the form of credits or points earned from other activities or behaviors by the user. For example, the user may earn points or credits by watching an advertisement or other content, winning other games or contests, completing a survey, referring a friend, sharing a link on social media, providing personal information, or any other method of earning points or credits.

Figure 6:
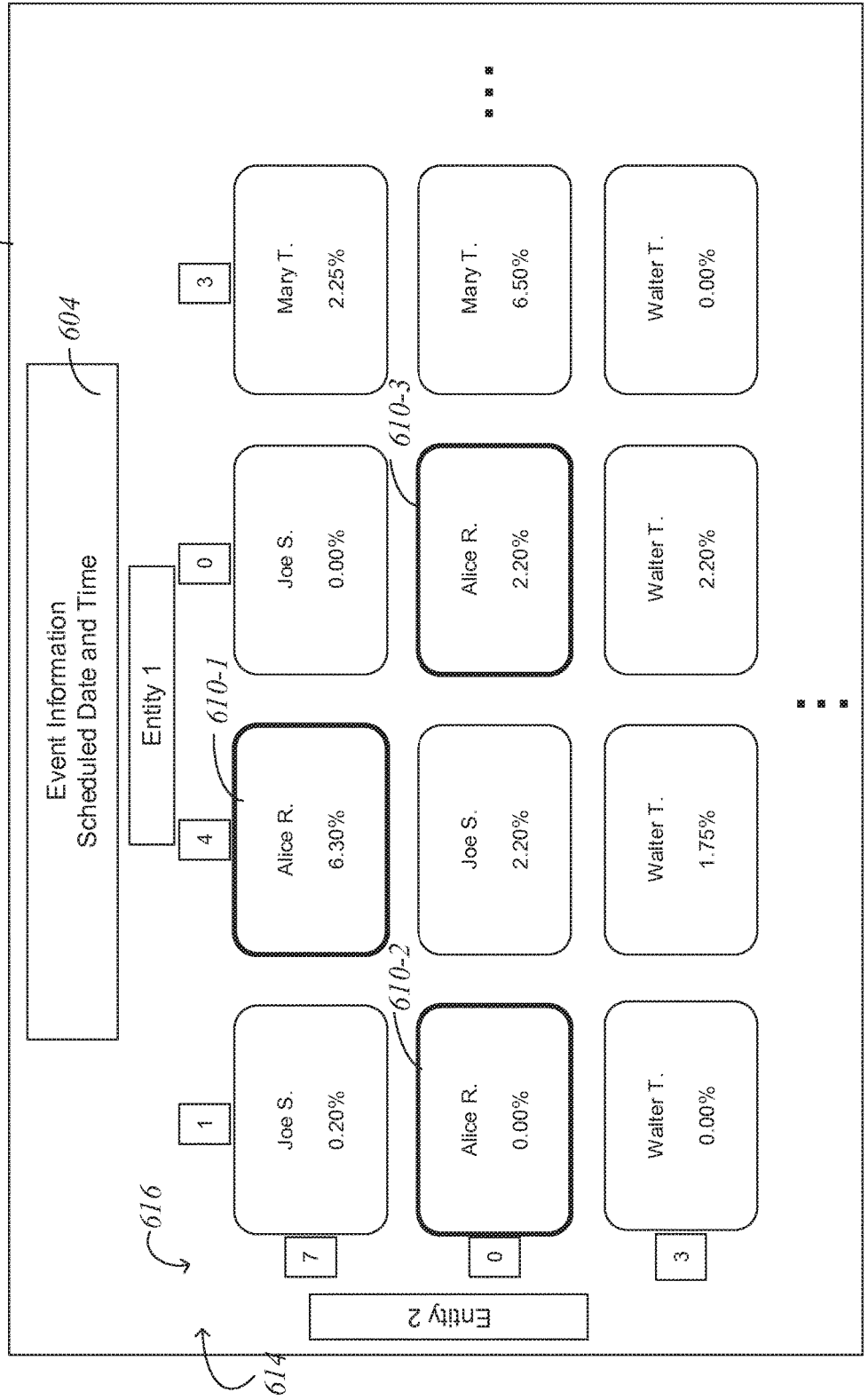
FIG. 6 illustrates an embodiment of a second user interface.

FIG. 6 illustrates an embodiment of a user interface (UI) 600. UI 600 may be presented by the user interface 210. UI 600 may include various UI elements that present information about an upcoming live event in one or more cells in a set of cells related to the upcoming live event. For example, and without limitation, UI 600 may include a display area 602 and a legend 604 that includes information about the live event, such as the names of the entities participating in the event, e.g. team names, and the scheduled date and time of the event. The cells visible in FIG. 6 may be a subset of an entire set of cells for the live event.

As shown in FIG. 6, UI 600 may represent the state of a set of cells after all, or a sufficient number of, cells are assigned to one or more user accounts. In particular, the cells have been assigned cell coordinates, which are now visible to a user. The cell coordinates corresponding to entity 1 are visible along the dimension indicated by arrow 614. The cell coordinates corresponding to entity 2 are visible along the dimension indicated by arrow 616. For example, the cell 610-1 has a cell coordinate of (4, 7), cell 610-2 has a cell coordinate of (1, 0), and cell 610-3 has a cell coordinate of (0, 0).

As shown in FIG. 6, the cells 610-2, 610-2, and 610-3 are all assigned to a user account for "Alice R." In some embodiments, the cells assigned to the user that is viewing UI 600 may be presented in different visual form to distinguish those "owned" cells from other cells assigned to other users. In this example, the cells "owned" by Alice R. have a darker border. Other methods of distinguishing the user's cells from others may be used, such as by using different colors, shading, shading patterns, fonts, font sizes, blinking effects and so forth. The embodiments are not limited to these examples.

In some embodiments, the probability calculator 350 may calculate the probability of each cell winning prior to the start of the live event. That is, the probability that an event result, represented by a cell coordinate, will occur is calculated. The calculation may be based on historical data for the entities in the event and their past events. For example, cell 610-1 has a 6.3% chance of winning, while cell 610-2 has a 0% chance of winning.

In some embodiments, the probabilities may be hidden until the cells are assigned. In other embodiments, the probabilities may be presented when the cell coordinates are generated. In embodiments where the cell coordinates are presented prior to assignment of the cells, the cost of selecting a cell may be dependent on the probability. For example, a cell with a higher probability of winning may require a larger payment relative to a cell having a lower probability of winning.

Figure 7:
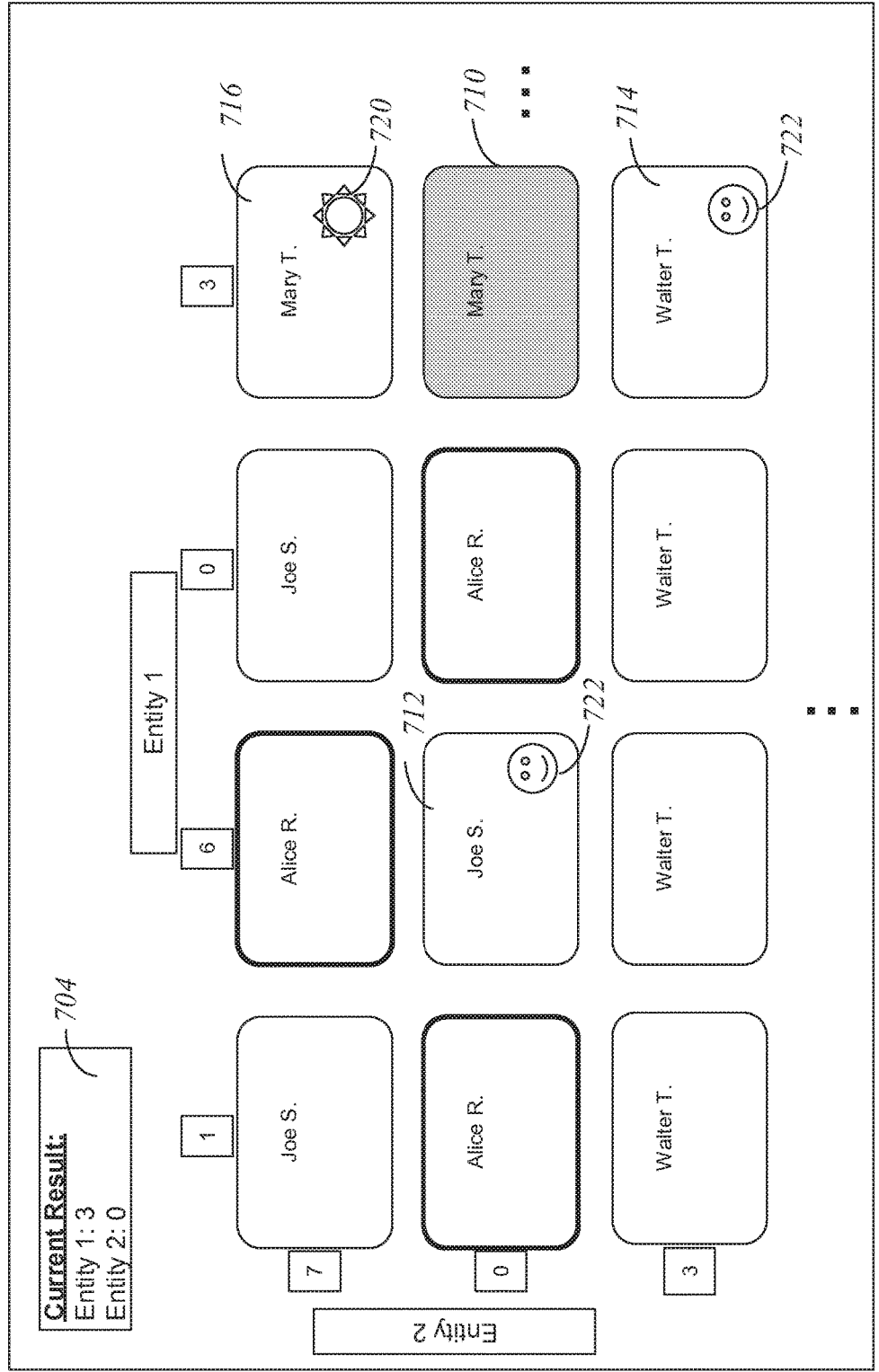
FIG. 7 illustrates an embodiment of a third user interface.

FIG. 7 illustrates an embodiment of a user interface (UI) 700. UI 700 may be presented by the user interface 210. UI 700 may represent a change to UI 600 once the associated live event has begun. As with UI 600, UI 700 may include a display area 702. The UI 700 may include a current state legend 706. The current state legend 706 may present, for example, and without limitation, a current score, time elapsed or remaining until the next event result determination, or other information about the event in progress.

Once the live event is underway, UI 700 may present predictive scoring indications. UI 700 may indicate which cell will be the winner if the current state remains unchanged by the end of the event time interval. For example, as shown in FIG. 7, cell 710, owned by Mary T. and having the coordinates (3, 0) will win if the score remains 3 to 0. Cell 710 is shown as shaded differently from the other cells. Other techniques may be used to indicate the current winning cell, such as coloring, shading patterns, icons, and so forth.

UI 700 may present other predictions. For example, if the live event associated with the set of cells in FIG. 7 is a football game, the next score might be a three-point field goal or a seven point touchdown with extra point. Accordingly, UI 700 may illustrate, for example with icon 722, that a field goal by Entity 1 will cause cell 712 to be the next winner, while a field goal by Entity 2 will cause cell 714 to be the next winner. UI 700 may use a different indication, e.g. icon 720, to show which cell, e.g. cell 716, will be the winner if a touchdown is scored next by Entity 2. Any combination of visual representations to distinguish current winners from predicted winners, and to distinguish among different scoring possibilities may be used without limitation. In some embodiments, audio or tactile differentiation may be used in addition to, or instead of, visual indications, for example, to inform the visually impaired of the current and predicted states of the live event.

In some embodiments, the probability calculator 350 may predict the probability of the predicted scoring possibilities, and UI 700 may present those probabilities in the relevant cells (not shown).

Figure 8:
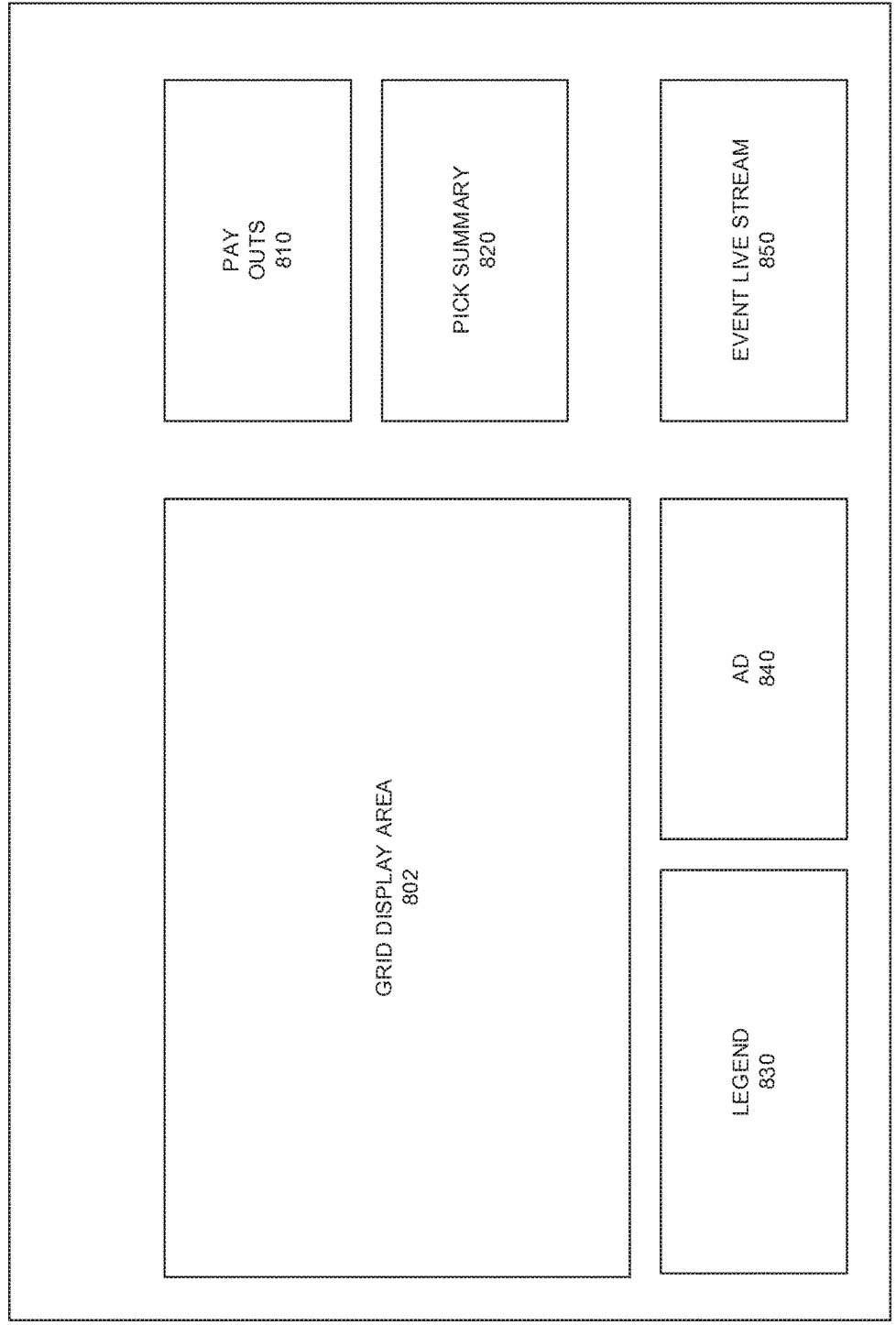
FIG. 8 illustrates an embodiment of a fourth user interface.

FIG. 8 illustrates an embodiment of a user interface (UI) 800. UI 800 may be presented by the user interface 210. UI 800 may include a plurality of different areas of information relating to the live event. For example, UI 800 may include a grid display area 802, which may correspond to display areas 502, 603, and/or 702. In addition, UI 800 may include an area to present pay outs 810. Pay outs 810 may present information about which users have already won during the live event, which cell coordinates have already won, and/or the amount or size of the reward.

The UI 800 may include an area to present a pick summary 820. A pick summary 820 may present historical information about previous events related to the current live event, or related to the group of users who won cells in the current set of cells. For example, the pick summary 820 may present the top ten historical winning cell coordinates, and the names of the users who own the cells associated therewith. The pick summary 820 may also present probabilities that the presented summarized cells will win.

The UI 800 may include a legend 830. The legend 830 may explain the meanings of the various visual indications within the grid display area 802. For example, the legend 830 may explain that icon 722 indicates "winner if field goal", that shading of one color indicates the current winner, and that icon 720 indicates "winner if touchdown."

The UI 800 may include an area for an advertisement 840. In some embodiments, advertisements may also be displayed behind other information, for example as a background image to the grid display area 802 or the pay outs area 810.

The UI 800 may also include an area to present a live stream of the event 850. The event live stream area 850 allows the user to view the live event in real time while keeping watch on the set of cells in the grid display area 802. This may provide a more exciting or interesting viewing experience over merely watching the event.

While the various presentation areas shown in FIG. 8 are shown in various sizes relative to each other, the embodiments are not so limited. The areas 802, 810, 820, 830, 840 and 850 may be larger or smaller than depicted, and relative to each other. Further, the arrangement of the areas may be changed, and more fewer, or other presentation areas may be used.

Figure 9:
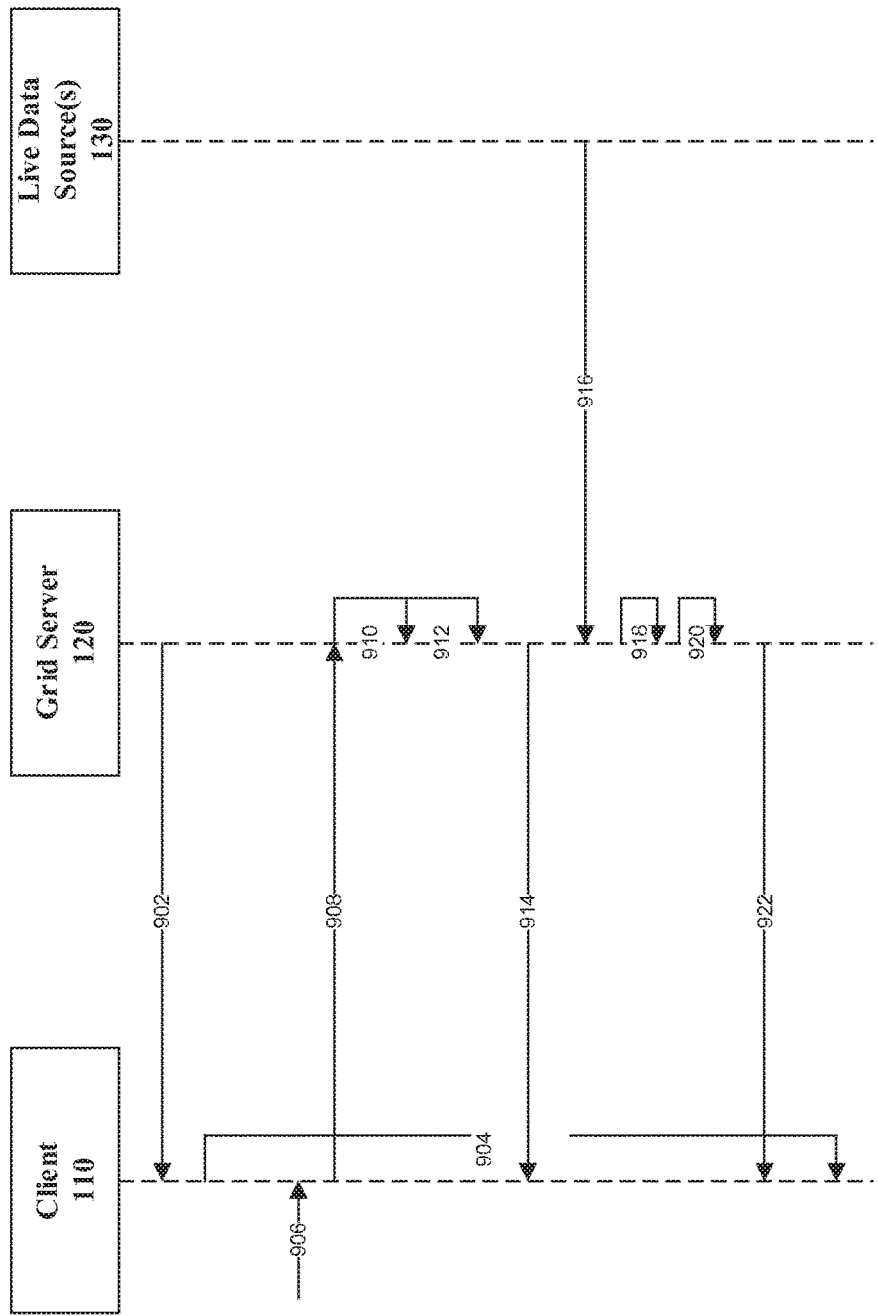
FIG. 9 illustrates an embodiment of a message flow.

FIG. 9 illustrates an embodiment of a message flow 900. Message flow 900 may represent messages communicated among the components of system 100. In particular, message flow 900 may occur among a client device 110, grid server 120, and live data sources 130. In message flow 900, time flows from the top of the diagram toward the bottom. Message flow 900 may represent messages communicated as a client interacts with a set of cells for a live event. Of note is that the message flow 900 assumes that an initial set of cells has been generated, e.g. a determined number of cells with cell identifiers associated with a specific live event.

Message flow 900 begins when the grid server 120 sends information about the generated set of cells to the client device 110 in message 902. Message 902 may be sent, for example, when the operator 108 of client device 110 responds to an invitation to participate in a box pool type interaction and selects a link to the set of cells. Message 902 may include, for example, instructions to display a number of cell in the cell set, and the cell identifiers of cells available for selection. In some embodiments, the operator of the client device 110 may need to set up a user account or log in to an existing user account before being sent the message 902.

Message flow 900 continues when the client device 110 displays the set of cells in message 904. The user interface 210 may use the information received in message 902 to present the set of cells on a display of the client device 110.

Message flow 900 continues when the client device 110 receives one or more selections of cells in message 906. For example, the operator of the client device 110 may use an input mechanism of the client device 110 to select one or more cells presented on the display 206.

Message flow 900 continues when the client device 110 sends information about the selected cells from message 906 to the grid server 120 in message 908. The message 908 may include, for example, the cell identifiers of the selected cells.

Message flow 900 continues when the grid server 120 assigns the selected cells to a user account in message 910. The user account assigned to the selected cells may be associated with the operator 108 of the client device 110 or with the client device 110.

Message flow 900 continues when the grid server 120 finalizes the set of cells in message 912. Message 912 may represent a number of operations including generating cell coordinates for the cells in the set, and calculating probabilities of each cell winning. Message 912 may be performed when a sufficient number of cells in the set of cells have been assigned to one or more user accounts. A sufficient number may be a threshold, such as more than 50% of the cells, at least 90% of the cells, all of the cells, and so forth.

Message flow 900 continues when the grid server 120 sends information about the finalized set of cells to the client device 110 in message 914. The client device 110 may then update the display of the set of cells according to the information in message 914. For example, the user interface 210 on the client device 110 may display the set of cells with information identifying the users who selected the various cells, and with the probability information.

Message flow 900 continues once the live event associated with the set of cells begins. The grid server 120 begins to receive live event data from the live data sources 130 in message 916. The grid server 120 may request the information, or may have the information pushed from the live data sources 130. In some embodiments, the grid server 120 may subscribe to a feed, such as a really simple syndication (RSS) feed from the live data sources 130, where the RSS feed is about a specific live event.

Message flow 900 continues when the grid server 120 parses the data from the message 916 in message 918. Information that may be parsed may include, for example and without limitation, a current score, which team has possession of a game ball, elapsed time, position on a playing field, or any other information that conveys a state of the live event. The parsing operation may be performed by known or future methods of extracting discrete information from a larger body of information, and may depend on the structure of message 916.

Message flow 900 continues when the grid server 120 uses the parsed information to predict results for the live event in message 920. For example, based on the current state of the live event, the parsed information may be used to predict which competitor will score next, and by how many points. In some embodiments, historical information about the type of event and/or the competitors may be used in predicting the next event result. In some embodiments, historical information about the type of event and/or the competitors may be used to calculate a probability of the predicted next event result.

Message flow 900 continues when the grid server 120 sends the predicted results to the client device 110 in message 922. The client device 110 may then update the display of the set of cells according to the information in message 922. For example, the user interface 210 on the client device 110 may display the set of cells with information identifying the users who selected the various cells, and with indications of which cells are predicted to win. The message 922 may also include information about the state of the live event, such as the current score, possession, filed position, next competitor, and so forth.

Messages 916, 918, 920, and 922 may be repeated throughout the live event.

Figure 10:
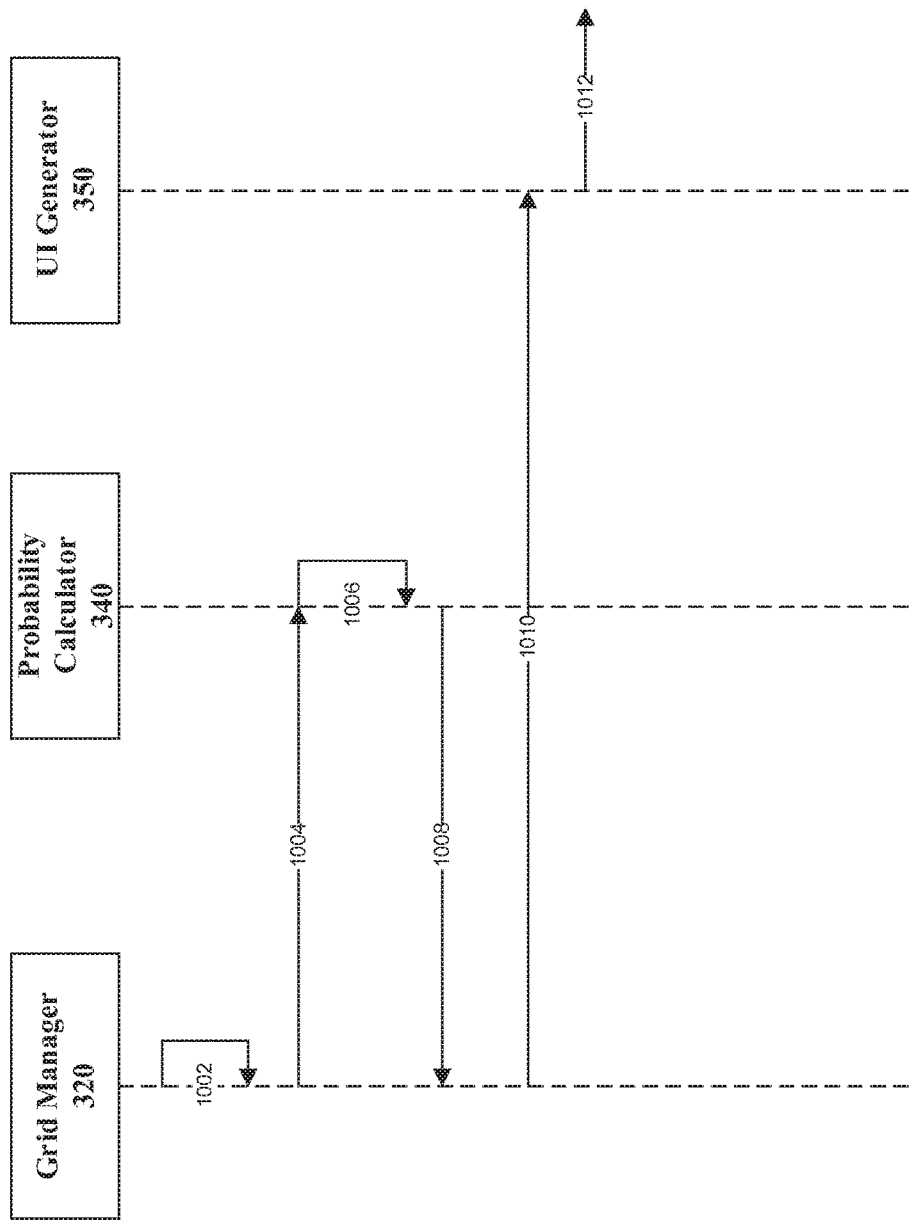
FIG. 10 illustrates an embodiment of a second message flow.

FIG. 10 illustrates an embodiment of a message flow 1000. Message flow 1000 may represent messages communicated among the components of system 100. In particular, message flow 1000 may occur among the functional elements of the grid server 310, e.g. the grid manager 320, the probability calculator 340 and the UI generator 350. In message flow 1000, time flows from the top of the diagram toward the bottom. Message flow 1000 may represent messages communicated once a set of cells is generated and the cells in the set are assigned to one or more user accounts.

Message flow 1000 begins when grid manager 320 generates cell coordinates for a set of cells in message 1002. The grid manager 320 may randomly assign coordinates to each cell in the set of cells such that each cell coordinate is unique in the set. Each coordinate comprises one or more dimensions, and the number of dimensions may depend on the number of entities participating in the live event, for example, how many teams or individual competitors or contestants. The values of each coordinate dimension may be generated from a set of available values, which may depend on the type of event and a representation of an event result. For some sporting events, the values may be generated from a set of positive single digit integers. For other events, the values may be generated from a set of rational numbers, or from a set of letters.

Message flow 1000 continues when the grid manager 320 sends the coordinates to the probability calculator 340 in message 1004. The message 1004 may include the cell coordinates for all of the cells in the set, and may optionally also include the cell identifiers for the cells, and/or an identifier for which user account is associated with each cell.

Message flow 1000 continues when the probability calculator 340, in message 1006, calculates probabilities that event results represented by each cell coordinate will occur during the live event. The probability calculator 340 may use historical data about the type of event and/or past events among the same entities to calculate a likelihood of an event result corresponding to each cell coordinate.

Message flow 1000 continues when the probability calculator 340 sends the calculated probabilities to the grid manager 320 in message 1008. The message 1008 may include, for each cell, the cell coordinate and/or the cell identifier and the probability calculated for that cell coordinate.

Message flow 1000 continues when the grid manager 320 sends the cell coordinates and the associated probabilities to the UI generator 350 in message 1010. In some embodiments, the probability calculator 340 may send the cell coordinates and the associated probabilities directly to the UI generator 350 instead.

Message flow 1000 continues when the UI generator 350 sends instructions to a client device (not shown) to update a presentation of the set of cells with the probabilities in message 1012. For example, the UI generator 350 may construct code that, when executed or called by the user interface 210, will present the probabilities in the associated presented cells. Alternatively, the UI generator 350 may provide the probabilities with the cell identifiers to the user interface 210, which may present the probabilities in association with each cell. The embodiments are not limited to these examples.

Figure 11:
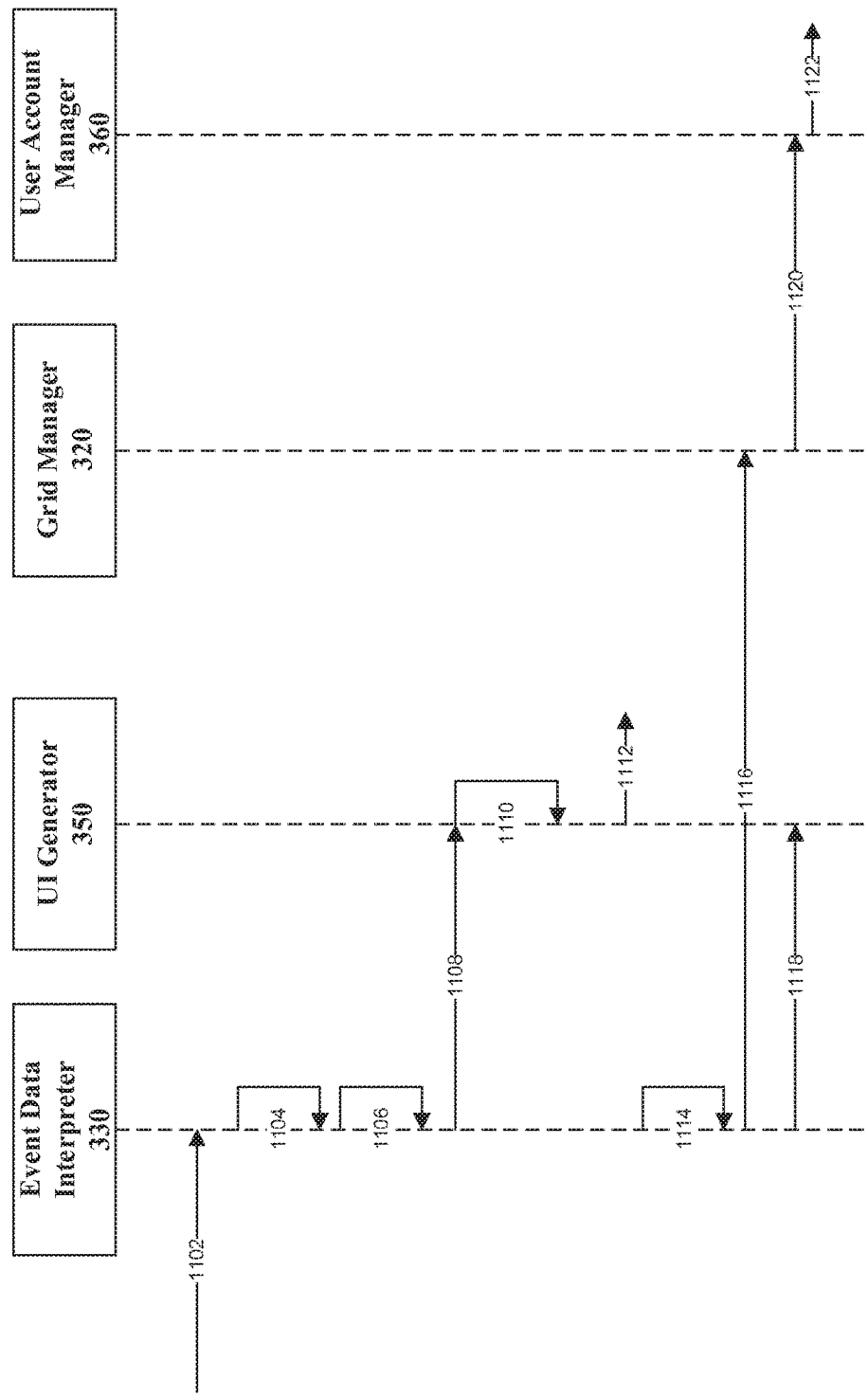
FIG. 11 illustrates an embodiment of a third message flow.

FIG. 11 illustrates an embodiment of a message flow 1100. Message flow 1000 may represent messages communicated among the components of system 100. In particular, message flow 1100 may occur among the functional elements of the grid server 310, e.g. the grid manager 320, the event data interpreter 330, the UI generator 350 and the user account manager 360. In message flow 1100, time flows from the top of the diagram toward the bottom. Message flow 1100 may represent messages communicated once a live event begins.

Message flow 1100 begins when the event data interpreter 330 receives live event data in message 1102. The event data interpreter 330 may request data for a particular live event, or may subscribe to receive data for a live event from the live data sources 130.

Message flow 1100 continues when the event data interpreter 330 parses the live event data in message 1104. The event data interpreter 330 may extract discrete elements of data about the live event, such as, but not limited to, a current score, a field position, a team or player in possession, an elapsed time, a time remaining, and any other indication of the current state of the live event.

Message flow 1100 continues when the event data interpreter 330 calculates a predicted event result in message 1106. The event data interpreter 330 may determine, based on a current state of the live event, what results are possible. For example, based on the team in possession, the number of downs, and the position of the offensive team on the field in a football game, the event data interpreter 330 may calculate that the offensive team could score a field goal or score a touchdown. In some embodiments, when more than one result may be possible, the event data interpreter 330 may select a more likely result as the predicted result. The event data interpreter 330 may add the predicted result to a current score for the relevant entity and identify the cell coordinate associated with the sum of the predicted and current scores.

Message flow 1100 continues when the event data interpreter 330 sends the predicted event results and cell coordinates associated with the predicted event results to the UI generator 350 in message 1108. The message 1108 may include one or more cell coordinates, for one or more predicted event results. For events where different event actions generate different numbers of points, the message 1108 may include an indication of what type of event action would result in the predicted event result. For example, the indication may include, for football, codes or other identifiers for a touchdown, a field goal, or a two-point conversion, while codes for basketball may indicate a foul shot, a regular basket shot, or a three-point shot. The embodiments are not limited to these examples.

Message flow 1100 continues when the UI generator 350 generates or updates instructions to present predicted event results in the set of cells in message 1110. For example, the UI generator 350 may construct code that when executed or called by the user interface 210 will present an indication of a predicted event result in the associated presented cells. Alternatively, the UI generator 350 may provide the cell identifiers of cells associated with the predicted event results to the user interface 210, which may alter the presentation of the associated cells. The embodiments are not limited to these examples.

Message flow 1100 continues when the UI generator 350 sends the instructions to one or more client devices 110 in message 1112 to update presentation of the set of cells on the client devices (not shown).

Message flow 1100 continues when the event data interpreter 330 detects, in message 1114, that a cell has coordinates that correspond to an event result at an event time interval. For example, the event data interpreter 330 may parse live event data and determine from the parsed data that an event time interval has occurred, e.g. the end of a quarter or half-time. The event data interpreter 330 may then compare the current score to the cell coordinates of a set of cells and identify the cell having coordinates that correspond to the current score.

Message flow 1100 continues when the event data interpreter 330 informs the grid manager 320 of the "winning" cell coordinate in message 1116. The message 1116 may include the cell coordinate and/or the cell identifier of the cell having coordinates that correspond to the event result, and may also include an indication that the cell has "won".

Message flow 1100 continues when the event data interpreter 330 informs the UI generator 350 of the "winning" cell coordinate in message 1118. Message 1118 may be similar to message 1116. The UI generator 350 may cause the user interface 210 to update the presentation of the set of cells to show that the winning cell has won (not shown).

Message flow 1100 continues when the grid manager 320 notifies the user account manager 360 of the winning cell in message 1120. The message 1120 may include the winning cell coordinate and/or an identification of a user account associated with the winning cell. The message 1120 may also include the type and size of reward to provide to the user account.

Message flow 1100 continues when the user account manager 360 rewards the user account assigned to the cell coordinate of the winning cell in message 1122. The user account manager 360 may deposit funds, points, credits, or other rewards into the user account. The user account manager 360 may also notify the user that they have won, for example, in an email message, a text message, a telephone call or other notification method.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 12:
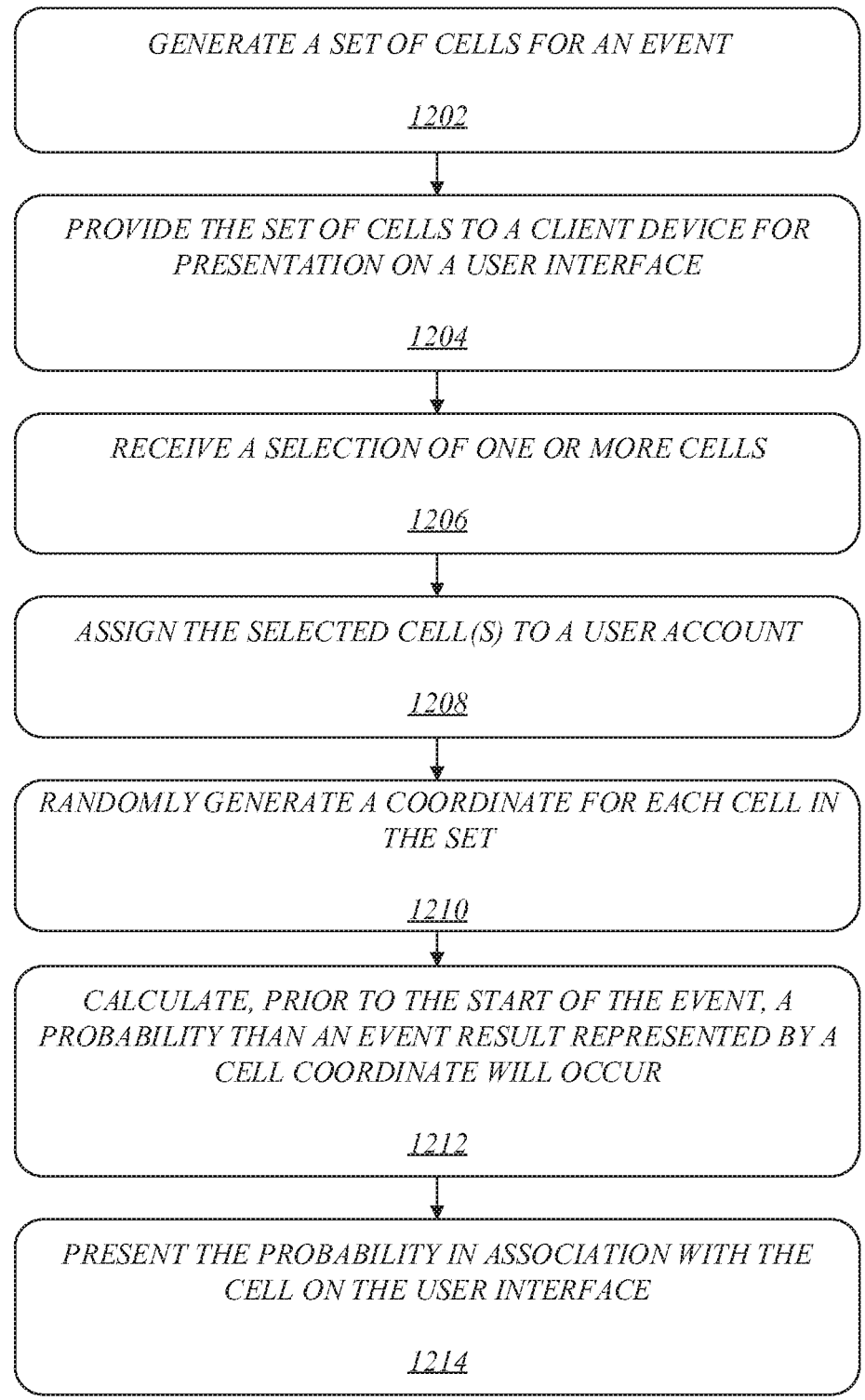
FIG. 12 illustrates a logic flow for the system of FIG. 1.

FIG. 12 illustrates a logic flow 1200. The logic flow 1200 may be representative of some or all of the operations executed by one or more embodiments described herein. In particular, the logic flow 1200 may represent the operations executed by grid server 120 prior to the start of a live event.

In the illustrated embodiment shown in FIG. 12, the logic flow 1200 may generate a set of cells at block 1202. For example, the grid server 120 may provide an interface through which a grid owner can specify a live event, and cause the grid server 120 to generate a set of cells associated with the live event. When generated, the set of cells may have cell identifiers, but may not yet have cell coordinates or be assigned to any user accounts.

The logic flow 1200 may provide the set of cells to a client device for presentation on a user interface at block 1204. For example, grid server 120 may, at the request of a client device 110, provide instructions and data files to the user interface 210 on the client device 110 such that the user interface 210 can present the set of cells on a display. The instructions and data files may be in the form of hypertext markup language (HTML) files, extensible markup language (XML) files, files that are in an application-specific format, graphic files, graphic objects, instructions for rendering graphic objects, and so forth. The grid server 120 may provide a generated web page including a visual arrangement of the set of cells for display within a web browser application on the client device 110. The embodiments are not limited to these examples.

The logic flow 1200 may receive a selection of one or more cells at block 1206. For example, the grid server 120 may receive the cell identifiers of the one or more cells that an operator of the client device 110 selected. In an embodiment, if the selecting operator does not yet have a user account, the grid server 120 may prompt the operator via the client device to create a user account before continuing. When the selecting operator has an existing user account, the grid server 120 may prompt a login operation, when the operator has not yet logged in to the user account.

The logic flow 1200 may assign the selected cells to a user account at block 1208. For example, the grid server 120 may associate a selected cell with the user account of the selecting operator. The association may take any form that allows the grid server 120 to identify the user account assigned to a cell, and in some embodiments, to identify cells assigned to a user account. Assigning the cells to a user account may also include obtaining payment according to a number of cells selected. The payment may be financial or in the form of points or other "costs" to the selecting user. In some embodiments, once the cells in the set are all assigned, further changes to cell ownership may be prevented. In some embodiments, further changes to cell ownership may be prevented when the start time of the event is within a defined time period, e.g. 2 minutes, even if all of the cells in the set are not assigned.

The logic flow 1200 may randomly generate a coordinate for each cell in the set at block 1210. For example, the grid manager 320 may produce a set of cell coordinates and may randomly assign the cell coordinates to the set of cells. The cell coordinates may be generated based on available values as defined by the type of event and/or values specified by the grid owner. In some embodiments, once the coordinates are generated, further changes to cell ownership may be prevented.

The logic flow 1200 may calculate a probability that an event result represented by a cell coordinate will occur at block 1212. For example, the probability calculator 350 may analyze historical data about previous events involving the same entities, or previous events of the same type, to determine a probability, for each cell coordinate, that an event result represented by the cell coordinate will occur. The probability calculation may include any known method of calculating probabilities. In some embodiments, newer historical data may be given heavier weight than older historical data in calculating the probabilities.

The logic flow 1200 may present the probability in association with the cell on the user interface at block 1214. For example, the cells presented on the user interface 210 on a client device may include a display of the probability in or near the associated cell.

Figure 13:
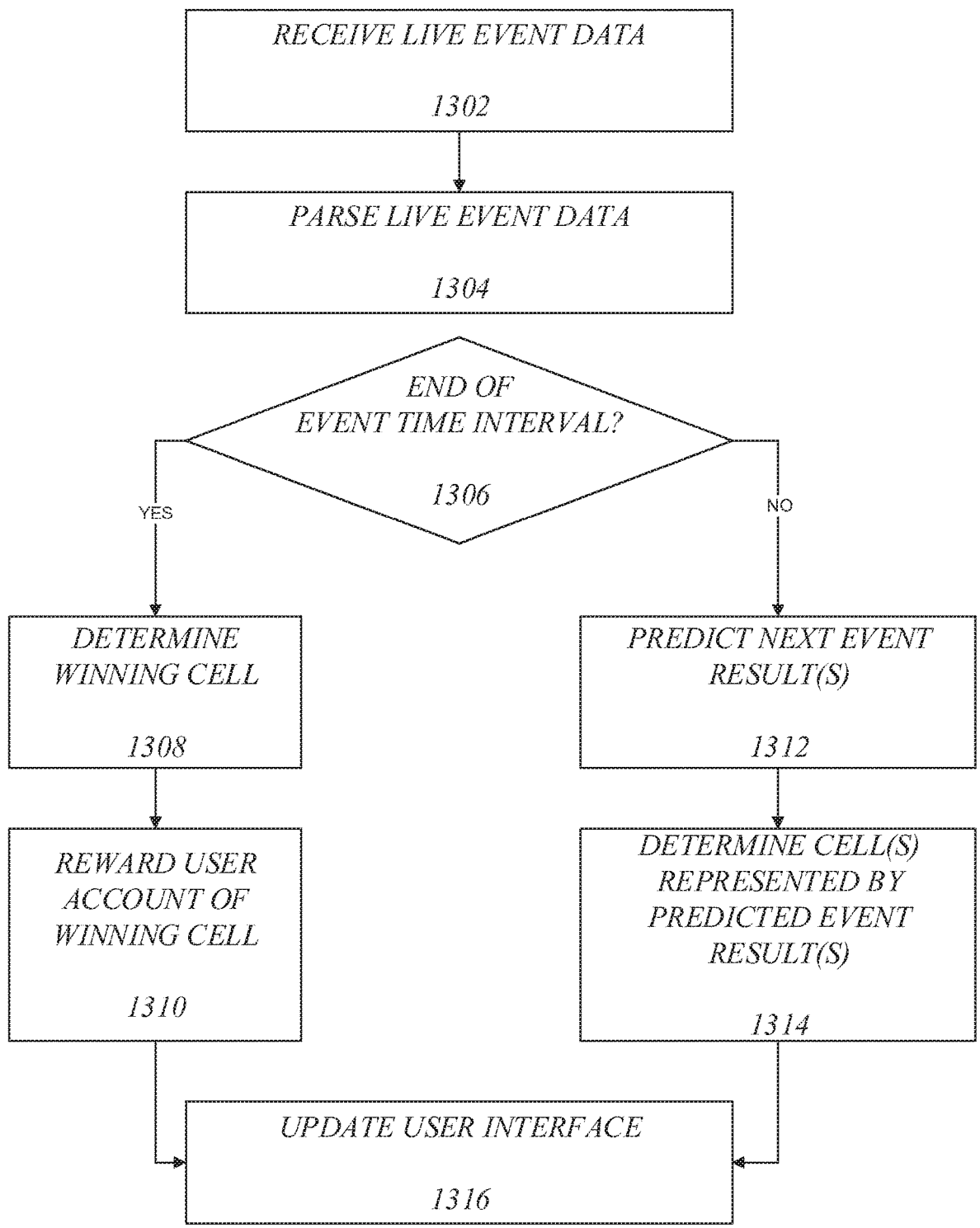
FIG. 13 illustrates a second logic flow for the system of FIG. 1.

FIG. 13 illustrates a logic flow for the system of FIG. 1. The logic flow 1300 may be representative of some or all of the operations executed by one or more embodiments described herein. In particular, the logic flow 1300 may represent the operations executed by grid server 120 after the start of a live event.

In the illustrated embodiment, shown in FIG. 13, the logic flow 1300 may receive live event data at block 1302. The live event data may be received from one or more live data sources 130. The received live data may represent all of the live data available from the live data sources 130, or may be a requested subset of live data that pertains only to live events associated with sets of cells.

The logic flow 1300 may parse the live event data at block 1304. The parsing operation(s) may depend on the format of the live event data. For example, the event data interpreter 330 may extract individual words or numbers from a stream of text that is separated by space or punctuation. When the live event data is structured, the event data interpreter 330 may extract the data from the structures. The embodiments are not limited to these examples. The parsed live event data may include, for example and without limitation, a current event result, an elapsed time, a remaining time, and any specific information about the state of the event and actions that have occurred since a previous receipt of live event data. For sporting events, this data may include field position, team in possession, recent plays, and so forth.

The logic flow 1300 may determine whether the end of an event time interval has occurred at block 1306. For example, the event data interpreter 330 may compare the state of the live event to any defined event time intervals associated with a set of cells to determine whether a defined event time interval has ended.

The logic flow 1300 may determine a winning cell at block 1308, when the end of an event time interval has occurred. For example, the event data interpreter 330 may provide an event result to the grid manager 320. The grid manager 320 may identify a cell having a cell coordinate that corresponds to the event result, which is the winning cell.

The logic flow 1300 may reward the user account of the winning cell at block 1310. For example, the grid manager 320 may instruct the user account manager 360 to reward the user account associated with the winning cell. The reward may be financial, or may include incentives such as points or credits that may be applied to other activities, or may include unlocking otherwise restricted content, for example.

The logic flow 1300 may predict one or more next event results at block 1312, when the end of an event time interval has not occurred. For example, the event data interpreter 330 may analyze the parsed live event data to determine a current state of the event, and may determine what event results are possible from the current state. The current state may include, for example, a current event result, a field position, a time remaining, and so forth. When the current event result may be changed, the event data interpreter 330 may calculate the changed result as the predicted result.

The logic flow 1300 may determine which cells represent the predicted event result(s) at block 1314. For example, the event data interpreter 330 may provide the predicted event result(s) to the grid manager 320. The grid manager 320 may identify the cell or cells having cell coordinates that corresponds to the event results.

The logic flow 1300 may update a user interface presenting the cells at block 1316. When proceeding from block 1310, the logic flow 1300 may cause the user interface 210 to present an indication that the winning cell has won. For example, a particular icon may be presented in the cell, or the color, shading, border, font or other style of the winning cell may be changed to indicate a win.

When proceeding from block 1314, the logic flow 1300 may cause the user interface 210 to present an indication that a cell may win. The logic flow 1300 may also cause the user interface 210 to present an indication of what event action may cause the cell to win, for example, a graphic, icon or text indicating that a touchdown or a field goal may cause the cell to win.

Figure 14:
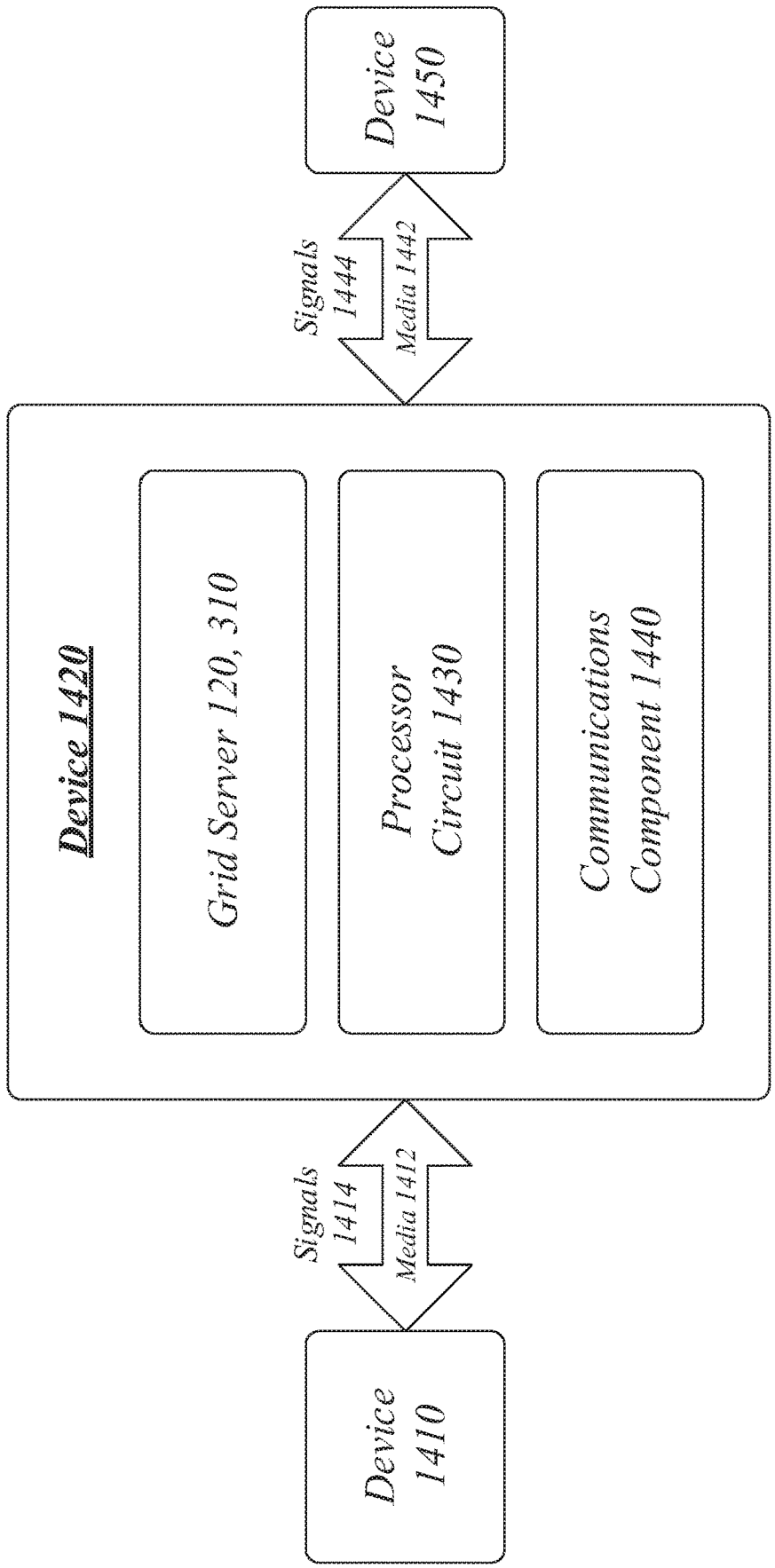
FIG. 14 illustrates an embodiment of a centralized system.

FIG. 14 illustrates a block diagram of a centralized system 1400. The centralized system 1400 may implement some or all of the structure and/or operations for the system 1400 in a single computing entity, such as entirely within a single device 1420.

The device 1420 may comprise some or all of the components of the grid server 120, and may also include a processor circuit 1430 and a communications component 1440.

The device 1420 may execute communications operations or logic for the system 1400 using communications component 1440. The communications component 1440 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1440 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1412, 1442 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 1420 may communicate with other devices 1410, 1450 over communications media 1412, 1442, respectively, using communications signals 1414, 1444, respectively, via the communications component 1440. The devices 1410, 1450 may be internal or external to the device 1420 as desired for a given implementation. Devices 1410, 1450 may include, for example, client devices 110, and live data sources 130.

Figure 15:
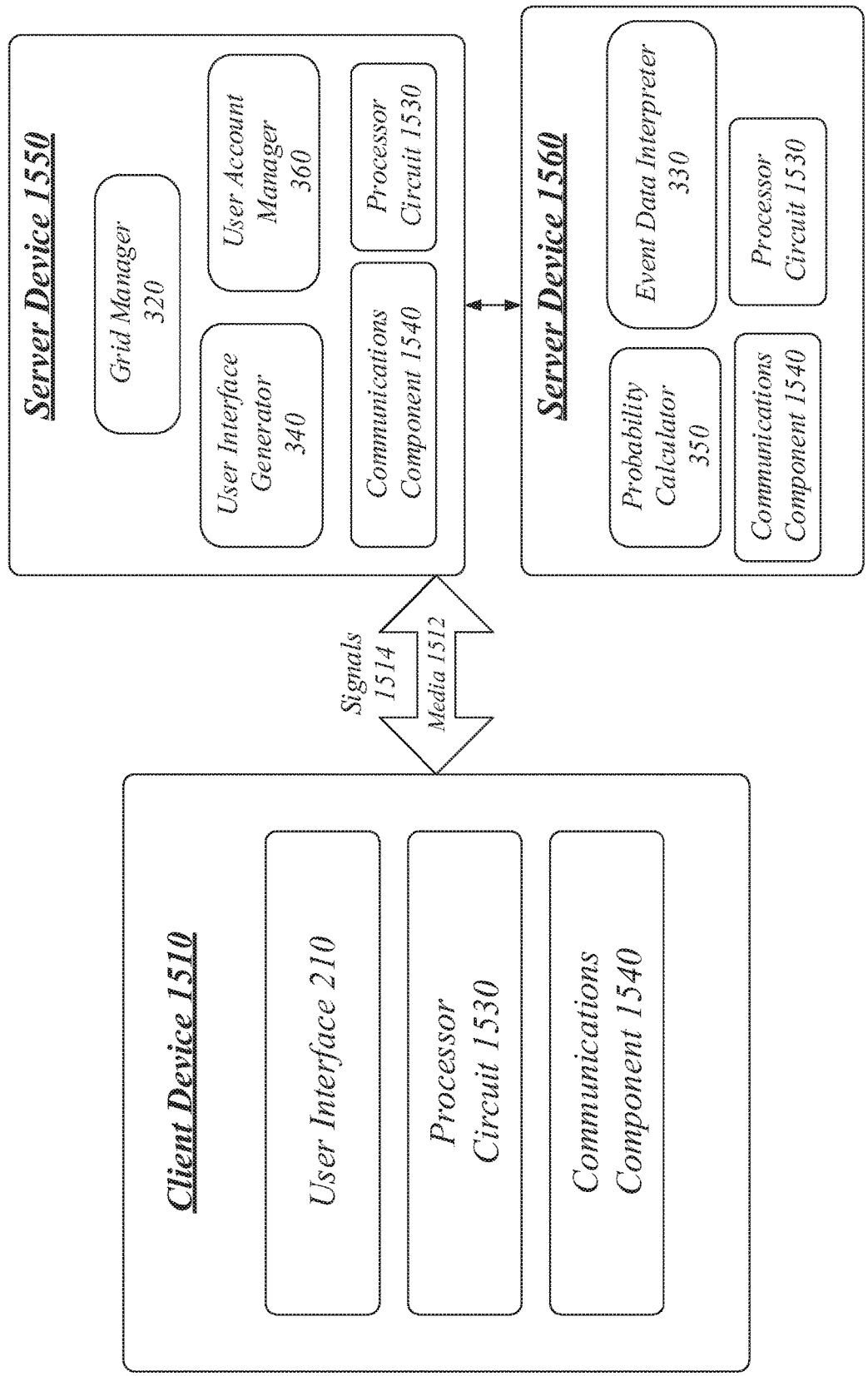
FIG. 15 illustrates an embodiment of a distributed system.

FIG. 15 illustrates a block diagram of a distributed system 1500. The distributed system 1500 may distribute portions of the structure and/or operations for the system 100 across multiple computing entities. Examples of distributed system 1500 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1500 may comprise a client device 1510 and a server devices 1550 and 1560. In general, the client device 1510 may be the same or similar to the client device 110, 200, and the server devices 1550 and 1560 may be the same or similar to grid server 120, 310, as described with reference to FIGS. 1-3. For instance, the client system 1510 and the server devices 1550 and 1560 may each comprise a processor circuit 1530 and a communications component 1540 which are the same or similar to the processor circuit 202, and the communications component 208 and network interface 308, respectively. In another example, the devices 1510, 1550 and 1560 may communicate over a communications media 1512 using communications signals 1514 via the communications components 1540.

The client device 1510 may comprise or employ one or more client programs that operate to perform various methodologies in accordance with the described embodiments. In one embodiment, for example, the client device 1510 may implement user interface 210.

The server device 1550 may comprise or employ one or more server programs that operate to perform various methodologies in accordance with the described embodiments. In one embodiment, for example, the server device 1550 may implement at least some of the components of grid server device 310, such as the grid manager 320, the user interface generator 340 and the user account manager 360.

The server device 1560 may implement some or all of other components of grid server device 310, such as the event data interpreter 330 and the probability calculator 350. Client device 1510 may request and receive a set of cells for presentation from server device 1550, as well as updates to the presentation as live data is received. The server device 1550 may request the live event data, or predictions and probabilities from the server device 1560. Other server devices may implement, for example, the live data sources 130.

Figure 16:
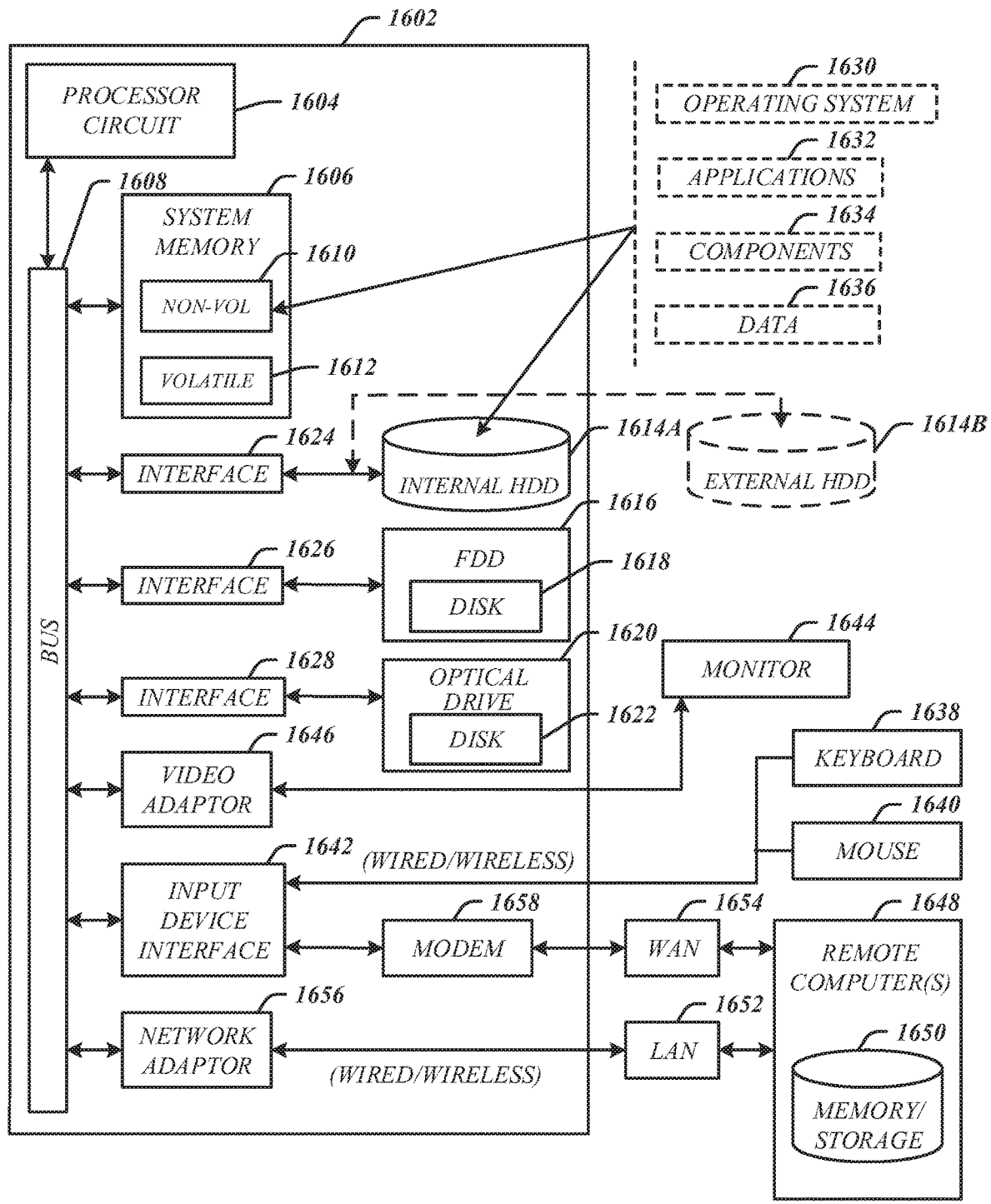
FIG. 16 illustrates an embodiment of a computing architecture.

FIG. 16 illustrates an embodiment of an exemplary computing architecture 1600 suitable for implementing various embodiments as previously described. In one embodiment, the computing architecture 1600 may comprise or be implemented as part of an electronic device. Examples of an electronic device may include those described with reference to FIGS. 1-3, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1600.

As shown in FIG. 16, the computing architecture 1600 comprises a processing unit 1604, a system memory 1606 and a system bus 1608. The processing unit 1604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1604.

The system bus 1608 provides an interface for system components including, but not limited to, the system memory 1606 to the processing unit 1604. The system bus 1608 can be any of several types of bus structure that may further interconnect to a memory bus (with or without a memory controller), a peripheral bus, and a local bus using any of a variety of commercially available bus architectures. Interface adapters may connect to the system bus 1608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1600 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 16, the system memory 1606 can include non-volatile memory 1610 and/or volatile memory 1612. A basic input/output system (BIOS) can be stored in the non-volatile memory 1610.

The computer 1602 may include various types of computer-readable storage media in the form of one or more lower speed memory units, including an internal (or external) hard disk drive (HDD) 1614A and 1614B, respectively, a magnetic floppy disk drive (FDD) 1616 to read from or write to a removable magnetic disk 1618, and an optical disk drive 1610 to read from or write to a removable optical disk 1622 (e.g., a CD-ROM or DVD). The HDD 1614, FDD 1616 and optical disk drive 1610 can be connected to the system bus 1608 by a HDD interface 1624, an FDD interface 1626 and an optical drive interface 1628, respectively. The HDD interface 1624 for external drive implementations can include at least one or both of Universal Serial Bus (USB) and IEEE 1694 interface technologies.

The drives and associated computer-readable storage media provide volatile and/or nonvolatile storage of data, data structures, computer-executable instructions, and so forth. For example, a number of program components can be stored in the drives and memory units 1610, 1612, including an operating system 1630, one or more application programs 1632, other program components 1634, and program data 1636. In one embodiment, the one or more application programs 1632, other program components 1634, and program data 1636 can include, for example, the various applications and/or components of the system 100.

An operator can enter commands and information into the computer 1602 through one or more wire/wireless input devices, for example, a keyboard 1638 and a pointing device, such as a mouse 1640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1604 through an input device interface 1642 that is coupled to the system bus 1608, but can be connected by other interfaces such as a parallel port, IEEE 1394 serial port, a game port, a USB port, an IR interface, and so forth.

A monitor 1644 or other type of display device is also connected to the system bus 1608 via an interface, such as a video adaptor 1646. The monitor 1644 may be internal or external to the computer 1602. In addition to the monitor 1644, a computer typically includes other peripheral output devices, such as speakers, printers, and so forth.

The computer 1602 may operate in a networked environment using logical connections via wire and/or wireless communications to one or more remote computers, such as a remote computer 1648. The remote computer 1648 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1650 is illustrated. The logical connections depicted include wire/wireless connectivity to a local area network (LAN) 1652 and/or larger networks, for example, a wide area network (WAN) 1654. Such LAN and WAN networking environments are commonplace in offices and companies, and facilitate enterprise-wide computer networks, such as intranets, all of which may connect to a global communications network, for example, the Internet.

When used in a LAN networking environment, the computer 1602 is connected to the LAN 1652 through a wire and/or wireless communication network interface or adaptor 1656. The adaptor 1656 can facilitate wire and/or wireless communications to the LAN 1652, which may also include a wireless access point disposed thereon for communicating with the wireless functionality of the adaptor 1656.

When used in a WAN networking environment, the computer 1602 can include a modem 1658, or is connected to a communications server on the WAN 1654, or has other means for establishing communications over the WAN 1654, such as by way of the Internet. The modem 1658, which can be internal or external and a wire and/or wireless device, connects to the system bus 1608 via the input device interface 1642. In a networked environment, program components depicted relative to the computer 1602, or portions thereof, can be stored in the remote memory/storage device 1650. It will be appreciated that the network connections shown are exemplary and other means of establishing a communications link between the computers can be used.

The computer 1602 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 17:
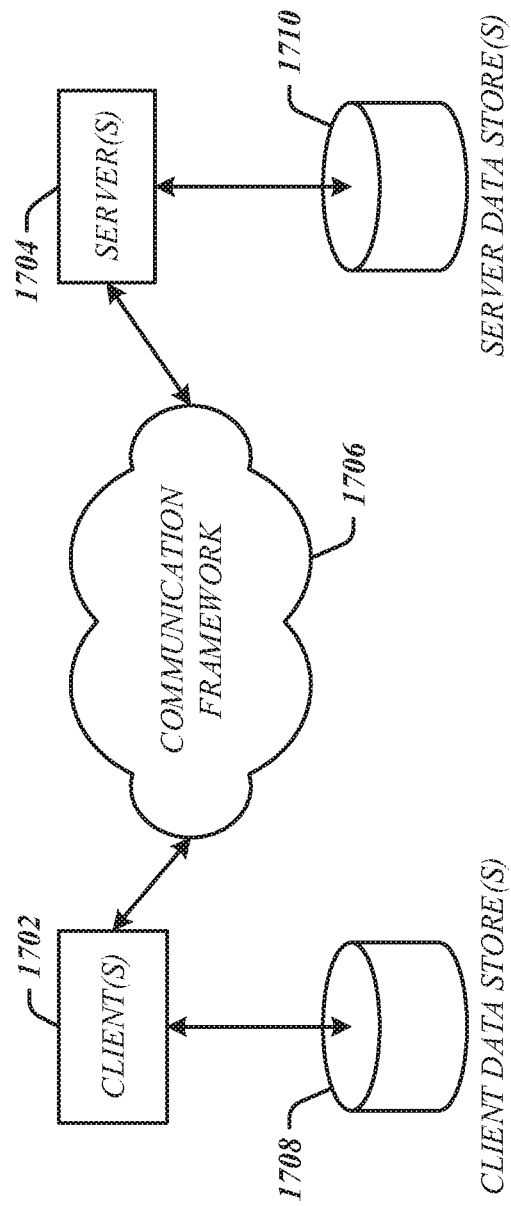
FIG. 17 illustrates an embodiment of a communications architecture.

FIG. 17 illustrates a block diagram of an exemplary communications architecture 1700 suitable for implementing various embodiments as previously described. The communications architecture 1700 includes various common communications elements, such as a transmitter, receiver, transceiver, radio, network interface, baseband processor, antenna, amplifiers, filters, power supplies, and so forth. The embodiments, however, are not limited to implementation by the communications architecture 1700.

As shown in FIG. 17, the communications architecture 1700 comprises includes one or more clients 1702 and servers 1704. The clients 1702 may implement the client devices 110, 200. The servers 1704 may implement any of server devices 120, 310. The clients 1702 and the servers 1704 are operatively connected to one or more respective client data stores 1708 and server data stores 1710 that can be employed to store information local to the respective clients 1702 and servers 1704, such as cookies and/or associated contextual information.

The clients 1702 and the servers 1704 may communicate information between each other using a communication framework 1706. The communications framework 1706 may implement any well-known communications techniques and protocols. The communications framework 1706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1706 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1702 and the servers 1704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

A computer-implemented method may comprise generating a set of cells for an event. The method may comprise providing the set of cells to a client device to present in a user interface and receiving a selection of a cell from the client device. The method may comprise assigning the selected cell to a user account and randomly generating a coordinate for each cell in the set, wherein each cell coordinate includes a plurality of dimensions, each dimension corresponding to a different entity of the event, and wherein each cell coordinate is unique for the set of cells. The method may comprise calculating, prior to the start of the event, a probability that an event result represented by a cell coordinate will occur; and presenting the probability in association with the cell on the user interface. Randomly generating a coordinate for a cell may comprise randomly generating an integer for each dimension of the coordinate.

The method may comprise receiving, after the start of the event, live data about the event; parsing the live data; predicting, using the parsed live data, an event result; and presenting an indication in the cell having a cell coordinate representing the predicted event result. The method may comprise calculating a probability of the predicted event result; and presenting the probability in association with the cell representing the predicted event result on the user interface.

The event may comprise a sporting event and an event entity may comprise a competitor in the sporting event.

The method may comprise determining, at an event time interval, which cell has a cell coordinate that corresponds to a status of the event; presenting an indication in the determined cell; notifying the user assigned to the determined cell; and providing a reward to the user account of the notified user.

The method may comprise generating the set of cells before the start of the event.

The method may comprise receiving payment for the selected cell from the user account.

The method may comprise providing a live data stream of the event to the client device. The method may comprise providing a live data stream of the event to a second client device associated with the user account.

The method may comprise generating the cell coordinates when all of the cells in the set are associated with one or more users, or when a threshold number of cells in the set are associated with one or more users.

The method may comprise selecting additional content related to the event; and providing the additional content to the client device for display on the user interface. The additional content may comprise: an advertisement, a survey, an article, a blog entry, or a link.

The method may comprise assigning to each cell an identifier unique for the set of cells.

An apparatus may comprise a processor circuit; a grid manager operative on the processor circuit to: generate a set of cells for an event, assign a cell coordinate to each cell in the set, wherein each cell coordinate includes a plurality of dimensions, each dimension corresponding to a different entity of the event, and wherein each cell coordinate is unique for the set of cells, and assign a cell to a user account; an event data interpreter operative on the processor circuit to receive live data about the event, parse the live data, predict an event result from the parsed live data, and compare the predicted event result to cell coordinates for a set of cells; a network interface operative on the processor circuit to communicate the set of cells to a client device; and a user interface generator operative on the processor circuit to generate a user interface for presentation on a client device, receive the set of cells from the grid manager, and present the set of cells in the user interface via the network interface.

The probability calculator may calculate a probability that an event result represented by a cell coordinate will occur during the event, and the user interface generator to present the probability in associated with the cell having the cell coordinate on the user interface. The probability calculator may calculate a percentage of instances of events where the cell coordinates of a cell corresponded to an event result, and the user interface generator may present the percentage in association with the cell on the user interface.

The user interface generator may receive the cell coordinates that match a predicted event, and modify an appearance of the cell having the cell coordinates on the user interface.

The event data interpreter may determine, at an event time interval, which cell has a cell coordinate that corresponds to a status of the event, provide the cell coordinate to the user interface generator, and notify a user assigned to the determined cell, and the user interface generator operative to presenting an indication in the determined cell.

The apparatus may include a user account manager operative on the processor circuit to receive a selection of a cell and a user account from a client device and assign a user account to the selected cell. The user account manager may receive a payment from a user account, and provide a reward to the user account when a cell assigned to the user account has a cell coordinate that corresponds to a status of the event at an event time interval.

The apparatus may include an additional content manager operative on the processor circuit to provide a live data stream of the event to the client device or to a second client device associated with a user account. The content manager may select additional content related to the event; and provide the additional content to the client device for display on the user interface.

At least one computer-readable storage medium may comprise instructions that, when executed, cause an apparatus to: receive live data about an event in progress; parse the live data; predict an event result according to the parsed live data; compare the predicted event result to cell coordinates for a set of cells, wherein each cell coordinate includes a plurality of dimensions, each dimension corresponding to a different entity of the event, and wherein each cell coordinate is unique for the set of cells; and notify a user interface component of a cell having cell coordinates that match the predicted event result.

The computer-readable storage medium may further comprise instructions that, when executed, cause the apparatus to: calculate a probability that an event result represented by a cell coordinate will occur during the event; and provide the probability to the user interface component.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method comprising:
   receiving selection of a first cell of a plurality of cells generated for an event;
   assigning the first cell to an account;
   generating a coordinate for each cell in the plurality of cells, wherein each coordinate comprises at least two dimensions, each dimension corresponding to a different entity of the event, and each coordinate unique for the plurality of cells;
   determining, by a processor circuit, a rate of winning of the account based a number of times the account was associated with winning cells in a plurality of past events;
   determining, by the processor circuit, a reward for the account based on the rate of winning;
   receiving, after the start of the event, live data about the event;
   parsing the live data;
   predicting, based on the parsed live data, an event result; and
   displaying, on a display device, an indication in the cell having the coordinate representing the event result.

2. The method of claim 1, further comprising:
   computing, by the processor circuit, a probability of the event result; and
   displaying the probability in association with the cell representing the event result on the display device.

3. The method of claim 1, further comprising:
   generating the coordinate for each cell by randomly generating an integer for each dimension of the coordinate.

4. The method of claim 1, wherein the event comprises a sporting event and an event entity comprises a competitor in the sporting event, the method further comprising:
   computing, by the processor circuit prior to the start of the event, a probability that an event result represented by a coordinate will occur; and
   displaying, on a display device, the probability in association with the cell having the coordinate.

5. The method of claim 1, comprising:
   determining, at an event time interval, which cell has a coordinate that corresponds to a status of the event;
   presenting, on a display device, an indication in the determined cell;
   notifying an account assigned to the determined cell; and
   providing a reward to the account assigned to the determined cell.

6. The method of claim 1, further comprising:
   generating a cell identifier for each cell, each cell identifier different than the coordinate for the cell, the cell identifier to uniquely identify the cell.

7. An apparatus comprising:
   a processor circuit;
   a memory storing instructions which when executed by the processor circuit cause the processor circuit to:
   receive selection of a first cell of a plurality of cells generated for an event;
   assign the first cell to an account;
   generate a coordinate for each cell in the plurality of cells, wherein each coordinate comprises at least two dimensions, each dimension corresponding to a different entity of the event, and each coordinate unique for the plurality of cells;
   determine a rate of winning of the account based a number of times the account was associated with winning cells in a plurality of past events;
   determine a reward for the account based on the rate of winning;
   receive, after the start of the event, live data about the event;
   parse the live data;
   predict, based on the parsed live data, an event result; and
   display, on a display device, an indication in the cell having the coordinate representing the event result.

8. The apparatus of claim 7, the memory storing instructions which when executed by the processor circuit cause the processor circuit to:
   compute a probability of the event result; and
   displaying the probability in association with the cell representing the event result on the display device.

9. The apparatus of claim 7, the memory storing instructions which when executed by the processor circuit cause the processor circuit to:
   receive the coordinates that match a predicted event; and
   modify, on a display device, an appearance of the cell having the coordinates.

10. The apparatus of claim 7, the memory storing instructions which when executed by the processor circuit cause the processor circuit to:
    determine, at an event time interval, which cell has a coordinate that corresponds to a status of the event;
    present, on a display device, an indication in the determined cell;
    notify an account assigned to the determined cell; and
    provide a reward to the account assigned to the determined cell.

11. The apparatus of claim 7, the memory storing instructions which when executed by the processor circuit cause the processor circuit to:
generate a cell identifier for each cell, each cell identifier different than the coordinate for the cell, the cell identifier to uniquely identify the cell.

12. The apparatus of claim 7, the memory storing instructions which when executed by the processor circuit cause the processor circuit to:
generate the coordinate for each cell by randomly generating an integer for each dimension of the coordinate.

13. A non-transitory computer-readable storage medium comprising instructions that, when executed by a processor circuit cause the processor circuit to:
receive live data about an event in progress;
parse the live data;
predict an event result according to the parsed live data;
compare the predicted event result to coordinates for a plurality of cells, wherein each coordinate comprises at least two dimensions, each dimension corresponding to a different entity of the event, and each coordinate unique for the plurality of cells;
determine a rate of success of an account based on a plurality of past events and a number of times the account was associated with winning cells in the plurality of past events; and
determine a reward for the account based on the rate of success.

14. The computer-readable storage medium of claim 13, comprising instructions that when executed by the processor circuit cause the processor circuit to:
compute a probability that an event result represented by a coordinate will occur during the event; and
display the probability on a display device.

15. The computer-readable storage medium of claim 13, comprising instructions that when executed by the processor circuit cause the processor circuit to:
provide a live data stream of the event to a client device associated with the account.

16. The computer-readable storage medium of claim 13, comprising instructions that when executed by the processor circuit cause the processor circuit to:
select additional content related to the event; and
provide the additional content to a client device for display.

17. The computer-readable storage medium of claim 13, comprising instructions that when executed by the processor circuit cause the processor circuit to:
determine, at an event time interval, which cell has a coordinate that corresponds to a status of the event;
present, on a display device, an indication in the determined cell;
notify an account assigned to the determined cell; and
provide a reward to the account assigned to the determined cell.

18. The computer-readable storage medium of claim 13, comprising instructions that when executed by the processor circuit cause the processor circuit to:
generate the plurality of cells for the event prior to a start of the event;
invite one or more participants to select cells;
receive a selection of a first cell of the plurality of cells from one of the invited participants; and
assign the first cell to an account associated with the selecting invited participant.

* * * * *